(12) United States Patent
Saliba et al.

(10) Patent No.: US 11,277,480 B2
(45) Date of Patent: Mar. 15, 2022

(54) SYSTEM AND METHOD FOR TARGETED ENDPOINT DATA ACQUISITION

(71) Applicant: Magnet Forensics Inc., Waterloo (CA)

(72) Inventors: Jad John Saliba, Waterloo (CA); Andrew Gordon Roberts, Waterloo (CA); Nicholas Bruce Alexander Cosentino, Waterloo (CA); Kevin Brightwell, Waterloo (CA)

(73) Assignee: Magnet Forensics Investco Inc., Waterloo (CA)

( * ) Notice: Subject to any disclaimer, the term of this patent is extended or adjusted under 35 U.S.C. 154(b) by 0 days.

(21) Appl. No.: 17/038,069

(22) Filed: Sep. 30, 2020

(65) Prior Publication Data

US 2021/0099528 A1 Apr. 1, 2021

Related U.S. Application Data

(60) Provisional application No. 62/908,635, filed on Oct. 1, 2019.

(51) Int. Cl.
*H04L 29/08* (2006.01)
*H04L 67/145* (2022.01)
*H04L 67/1097* (2022.01)
*H04L 67/141* (2022.01)
(Continued)

(52) U.S. Cl.
CPC ........ *H04L 67/145* (2013.01); *H04L 67/1097* (2013.01); *H04L 67/141* (2013.01); *H04L 67/22* (2013.01); *H04L 67/42* (2013.01)

(58) Field of Classification Search
CPC ..... H04L 67/145; H04L 67/141; H04L 67/42; H04L 67/22; H04L 67/1097
See application file for complete search history.

(56) References Cited

U.S. PATENT DOCUMENTS 7,496,959 B2 * 2/2009 Adelstein .............. H04L 63/123
713/187
7,953,984 B1 * 5/2011 Chung .................. G06F 21/564
713/188

(Continued)

FOREIGN PATENT DOCUMENTS

CN 108512911 A 9/2018

OTHER PUBLICATIONS

European Patent Office, Extended European Search Report for EP Patent App. No. 20020443.6, dated Jan. 13, 2021.

*Primary Examiner* — Brian J. Gillis
*Assistant Examiner* — Jsing Forng Lin
(74) *Attorney, Agent, or Firm* — Own Innovation; James W. Hinton

(57) ABSTRACT

A computer system, method, and device perform targeted acquisition of data. The system includes an examiner device having a processor and a memory, an agent in the form of an executable program for finding and transferring targeted data, and a target endpoint system. The examiner device is configured to deploy the agent to the target endpoint system. The agent is configured to establish a connection with the examiner device. The examiner device is configured to send a request for targeted data to the agent. The agent is configured to locate the targeted data on the target endpoint system. The agent is configured to transfer the targeted data to the examiner device.

19 Claims, 23 Drawing Sheets

(51) Int. Cl.
*H04L 67/50* (2022.01)
*H04L 67/01* (2022.01)

(56) References Cited

U.S. PATENT DOCUMENTS

| | | | | |
|---|---|---|---|---|
| 8,375,134 | B2 * | 2/2013 | Herzog | H04L 67/2842 |
| | | | | 709/228 |
| 8,656,095 | B2 * | 2/2014 | Coulter | G06Q 10/00 |
| | | | | 711/112 |
| 8,793,277 | B2 * | 7/2014 | Morimoto | G06Q 50/18 |
| | | | | 707/780 |
| 9,167,047 | B1 * | 10/2015 | Sharma | H04L 41/0893 |
| 9,887,886 | B2 * | 2/2018 | Rahaman | H04L 41/5006 |
| 10,104,019 | B2 | 10/2018 | Cosentino et al. | |
| 10,354,062 | B2 * | 7/2019 | Schatz | G06F 21/00 |
| 2009/0288164 | A1 * | 11/2009 | Adelstein | H04L 63/123 |
| | | | | 726/22 |
| 2011/0074598 | A1 * | 3/2011 | Cornwall | G01D 4/002 |
| | | | | 340/870.01 |
| 2012/0209983 | A1 * | 8/2012 | Bronner | G06F 9/4843 |
| | | | | 709/224 |
| 2015/0350308 | A1 | 12/2015 | Cosentino et al. | |
| 2018/0063182 | A1 | 3/2018 | Jones et al. | |
| 2021/0099528 | A1 * | 4/2021 | Saliba | H04L 67/1097 |

* cited by examiner

EVIDENCE SOURCES

Remote Computer
MANAGE AGENTS

To review or acquire data on a remote device, select an existing agent from the table or create a new one. When you select an agent, you can either deploy the agent on the target device or connect to the agent to select the data to acquire remotely.

AGENTS
Select an agent to deploy or connect to, or create a new agent.

CREATE NEW AGENT

| Name | Location | Created Date/Time |
|---|---|---|
| Agent.exe | Agent - 2019-09-22 22-11-23 | 9/22/2019 10:12:22 PM |

Number of Agents: 1

EVIDENCE SOURCES

REMOTE COMPUTER
REVIEW AGENT

Review the masking, location, and connectivity details before you deploy or connect the agent.

AGENT MASKING DETAILS

- Agent name: CoverAgent.exe
- Agent title: Covert
- Agent company: MyCompany
- Agent product:
- Agent description:
- Agent copyright: Copyright MyCompany 2019
- Agent trademark:

SHOW FEWER DETAILS

LOCATION FOR AGENT

- Folder name: Agent - 2019-09-23 15-22-45
- File path: C:\Users\John\Documents\Documents\Cases\Agents

CONNECTIVITY DETAILS

- Examiner workstation hostname or IP address: 192.168.56.1
- Port: 4321
- Reconnect delay: 10 seconds
- Disconnected keep alive: 86400 seconds

[DEPLOY AGENT] [CONNECT AGENT]

EVIDENCE SOURCES

REMOTE COMPUTER
SELECT ITEMS TO DOWNLOAD

Computer name: REMOTECOMPUTER
User name: Target
Local end point: 192.168.36.101
Computer status: Connected ●

[STOP AND DELETE AGENT]

REVIEW AND SELECT THE DATA FROM THE TARGET COMPUTER

Review the files and folders on the remote computer and select the drives, files, folders, and memory that you want to download. To save time searching the complete list of files and folders, select targeted locations to view a list of typical files and folders that you might want to download.

TARGETED LOCATIONS        FILES AND DRIVES        MEMORY

ITEMS TO DOWNLOAD

| Item | Download start date/time | Status | |
|---|---|---|---|
| $MFT | 9/24/2019 3:29:30 PM | Completed | 100.75 MB |
| IFS INT1 | 9/24/2019 3:30:02 PM | Completed | 500 MB |
| dbaHos | 9/24/2019 3:34:25 PM | Completed | 643.97 KB |

SYSTEM AND METHOD FOR TARGETED ENDPOINT DATA ACQUISITION

TECHNICAL FIELD

The following relates generally to targeted data acquisition, and more particularly to systems and methods for acquiring targeted data from a remote endpoint system for the purposes of digital forensics.

INTRODUCTION

With the advent of computer technology and the Internet, many people spend large amounts of time using computers for many different reasons. For example, users may use computers in the course of employment, to access social networks, communicate with other people using email or chat applications, conduct online shopping, process digital photography, research information, and so on.

For various reasons, a user may attempt to hide, delete, or obfuscate some of this information so that it will not be readily accessible to someone else. In particular, this obfuscation may occur where a user has undertaken some illicit or otherwise improper activity (for example using a work computer to access improper materials) and does not want to be caught.

In some cases, it may be desirable for another party to know how a particular computer has been used by a given individual (or in some cases a group of individuals). For example, an employer may be interested to learn about the activities undertaken by an employee on one or more company computing devices, such as a laptop or smartphone or law enforcement may be interested in learning about activities on a suspect's computing device.

In some cases, the computing device of interest may or may not be physically inaccessible to the party that wants to know how that computing device has been used. However, if the computing device is on a shared network data which exists on the computing device may be accessible to the investigating party. An impediment to current systems of investigation of remote computing devices on shared networks is that they require the computing device of interest to be "online". For a company with employees in locations throughout the world, it is not always easy to access a computing device of interest when it is online.

Accordingly, there is a need for an improved system and method for targeted data acquisition from a remote computing device that overcomes at least some of the disadvantages of existing systems and methods.

SUMMARY

A system for targeted acquisition of data is provided. The system includes an examiner device having a processor and a memory, an agent in the form of an executable program for finding and transferring targeted data, and a target endpoint system. The examiner device is configured to deploy the agent to the target endpoint system. The agent is configured to establish a connection with the examiner device after the agent is deployed to the target endpoint system. The examiner device is further configured to send a request for targeted data to the agent after the connection is established. The agent is further configured to locate the targeted data on the target endpoint system and transfer the targeted data to the examiner device.

Upon receipt of the targeted data from the agent the examiner device may delete the agent from the target endpoint system.

Upon receipt of the targeted data from the agent the agent may remain on the target endpoint system.

If the connection between the agent and the examiner device is lost the connection may be re-established automatically.

The examiner device may create the agent by configuring agent masking details, location details, and connectivity details of the agent.

The agent may be further configured to attempt to establish a connection with the examiner device at a first defined interval of time until such time as the connection is established.

While the agent is deployed on the target endpoint system, the agent may be further configured to send a viability signal at a second defined interval of time to the examiner device to confirm that the agent is still active.

The targeted data may include any one or more of logical copies of files, binary data, memory, and live target endpoint system information.

A method of targeted acquisition of data from a target endpoint system is also provided. The method includes creating an agent by an examiner device, the agent comprising an executable program; deploying the agent to the target endpoint system by the examiner device; establishing a connection to the examiner device by the agent; requesting a first set of targeted data from the agent by the examiner device; and sending the first set of targeted data from the target endpoint system to the examiner device by the agent.

The method may further include requesting, based on the first set of targeted data, a second set of targeted data from the agent by the examiner device.

Creating the agent by the examiner device may include configuring masking details of the agent by the examiner device, configuring examiner device location details of the agent by the examiner device, and configuring connectivity details of the agent by the examiner device.

Deploying the agent to the target endpoint system by the examiner device may include configuring agent deployment details on the examiner device including target endpoint system information and a location at which to store the agent on the target endpoint device.

Connecting to the examiner device by the agent may include attempting to connect to the examiner device at a first defined interval of time by the agent.

If the connection is lost the method may further include re-establishing the connection between the agent and the examiner device automatically.

If the connection is lost when only a first part of the first set of targeted data has been sent by the agent, the method may further include sending a second part of the first set of targeted data to the examiner device by the agent upon re-establishing the connection.

The method may further include outputting a viability signal at a second defined interval of time by the agent while the agent is deployed on the target endpoint device, the viability signal demonstrating that the agent is active.

Requesting targeted data from the agent by the examiner device may include pre-selecting targeted data by the examiner device.

The method may further include deleting the agent from the target endpoint system upon receipt of the first set of targeted data by the examiner device.

The method may further include rebuilding at least part of a file system of the target endpoint system from the targeted data by the examiner device.

The targeted data may include any one or more of logical copies of files, binary data, memory, and live target endpoint system information.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification.

FIG. 5B is an image of a screen from the process of targeted data acquisition, in accordance with the present systems, devices, and methods.

FIG. 5C is an image of a screen from the process of targeted data acquisition, in accordance with the present systems, devices, and methods.

FIG. 5D is an image of a screen from the process of targeted data acquisition, in accordance with the present systems, devices, and methods.

FIG. 5E is an image of a screen from the process of targeted data acquisition, in accordance with the present systems, devices, and methods.

FIG. 5J is an image of a screen from the process of targeted data acquisition, in accordance with the present systems, devices, and methods.

FIG. 5O is an image of a screen from the process of targeted data acquisition, in accordance with the present systems, devices, and methods.

FIG. 5P is an image of a screen from the process of targeted data acquisition, in accordance with the present systems, devices, and methods.

DETAILED DESCRIPTION

Figure 1:
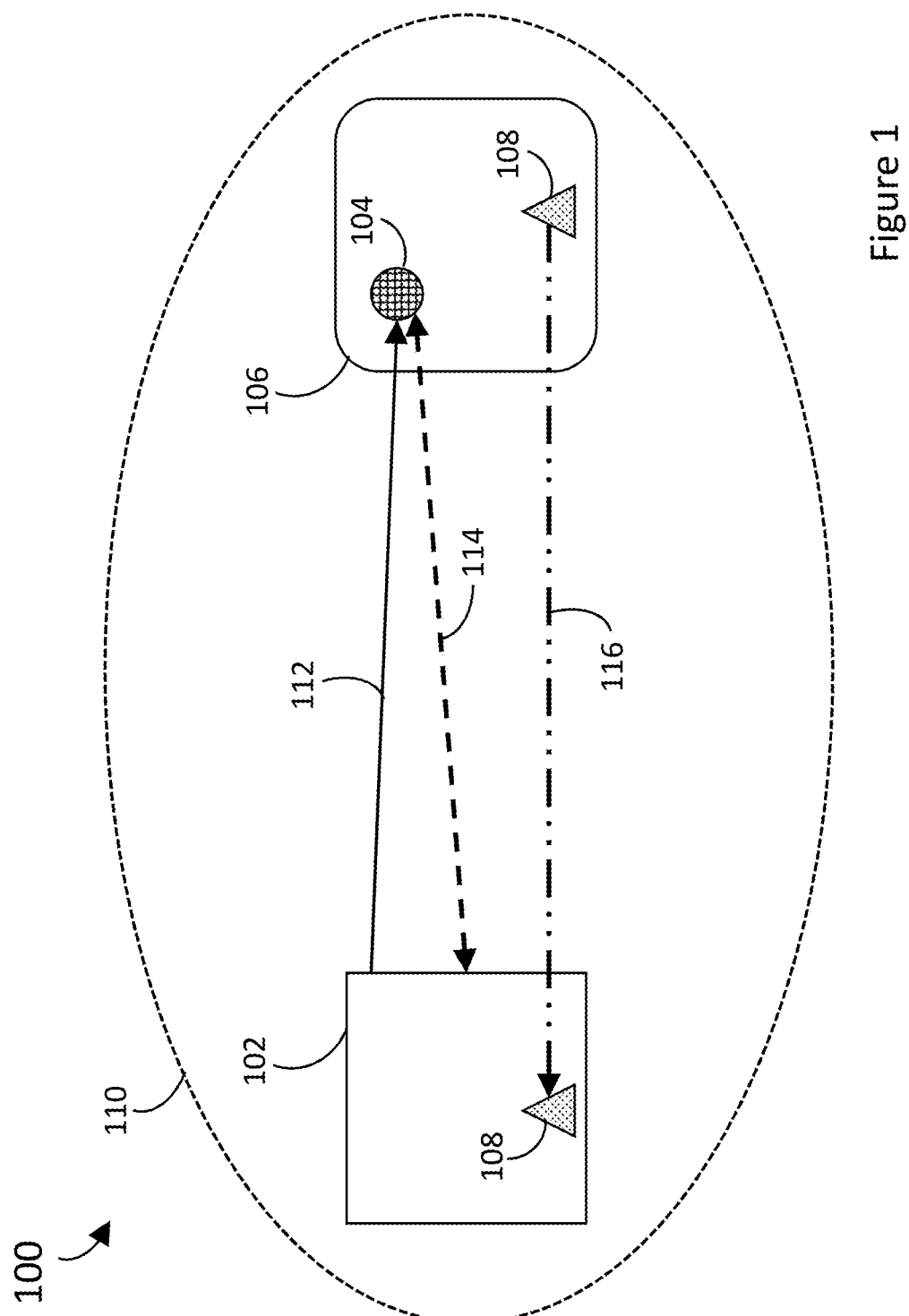
FIG. 1 is a schematic diagram of a targeted data acquisition system, in accordance with the present systems, devices, and methods.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Systems described herein may include a server platform which communicates with a plurality of user devices (employee devices) and a plurality of administrator devices (employer devices, examiner devices, etc.) via a network.

The server platform, user devices, and administrator devices may be a server computer, desktop computer, notebook computer, tablet, PDA, smartphone, or another computing device. The devices may include a connection with the network such as a wired or wireless connection to the Internet. In some cases, the network may include other types of computer or telecommunication networks. The devices may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network. Input devices may include any device for entering information into user/administrator devices. For example, an input device may be a keyboard, keypad, cursor-control device, touch-screen, camera, or microphone. Display devices may include any type of device for presenting visual information. For example, display devices may be a computer monitor, a flat-screen display, a projector or a display panel. Output devices may include any type of device for presenting a hard copy of information, such as a printer for example. Output devices may also include other types of output devices such as speakers, for example. In some cases, user/administrator devices may include multiple of any one or more of processors, applications, software modules, second storage devices, network connections, input devices, output devices, and display devices.

Although devices herein are described with various components, one skilled in the art will appreciate that the devices may in some cases contain fewer, additional or different components. In addition, although aspects of an implementation of the devices may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices and/or processor to perform a particular method.

In the description that follows, devices are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

A server platform may be configured to receive a plurality of information, from each of the user/administrator devices. Generally, the information may comprise at least an identifier identifying the user or administrator. For example, the information may comprise one or more of a username, e-mail address, password, or social media handle.

In response to receiving information, the server platform may store the information in storage database. The storage may correspond with secondary storage of the device. Generally, the storage database may be any suitable storage device such as a hard disk drive, a solid state drive, a memory card, or a disk (e.g. CD, DVD, or Blu-ray etc.). Also, the storage database may be locally connected with the server platform. In some cases, storage database may be located remotely from the server platform and accessible to the server platform across a network, for example. In some cases, storage database may comprise one or more storage devices located at a networked cloud storage provider.

Each user device may be associated with a user account. Each administrator device may be associated with an administrator account. Any suitable mechanism for associating a device with an account is expressly contemplated. In some cases, a device may be associated with an account by sending credentials (e.g. a cookie, login, or password etc.) to the server platform. The server platform may verify the credentials (e.g. determine that the received password matches a password associated with the account). If a device is associated with an account, the server platform may consider further acts by that device to be associated with that account. FIG. 1 is a schematic diagram of a targeted data acquisition system 100, in accordance with the present systems, devices, and methods. Targeted data acquisition system 100 includes examiner device 102 for use by an examiner, an agent 104 in the form of an executable program, and a target endpoint system 106 or a remote computing device. Target endpoint system 106 includes targeted data 108. Examiner device 102 and target endpoint system 106 are on a shared network 110 (represented by dashed oval encompassing examiner computing device 102 and target endpoint system 106).

References to "targeted data acquisition", "targeted acquisition", or "targeted data" throughout this specification mean that the data which is being acquired is specifically chosen by an examiner. References to an "examiner" throughout this specification refer to the person or party who is actively acquiring data from a target endpoint system. References to "connection" throughout the specification refer to a connection between two devices which allows for communication and transfer of data between those two devices.

Targeted data acquisition system 100 may be used in an investigation where a device or several devices of a target (e.g. target endpoint device 106) share a network with a device of an examiner (e.g. examiner device 102), including corporate investigations such as those for employee misconduct, fraud, intellectual property (IP) theft, or incident response. Beneficially, targeted acquisition system 100 does not require the targeted endpoint system device(s) to be connected to the network to acquire targeted data, which means that data can be acquired at any time from any global location.

Targeted data acquisition system 100 acquires data in the form of physical copies (binary data) or logical images of files/folders. The data may be acquired in a form that has not been reconstructed from fragments or artifacts. The data may be acquired in a format which is admissible evidence in legal proceedings (i.e., the data has not been reconstructed from fragments or artifacts). This also allows for all of the forensic components of an investigation to occur on the examiner device.

Examiner device 102 may be a device having at least one processor and a memory, wherein the memory holds data and/or instructions which when executed by the processor allow examiner device 102 to acquire targeted data from a target endpoint system on a shared network.

Target endpoint system 106 may be a remote device which stores data such as a mobile phone, laptop, desktop, tablet, cloud device, etc., and which shares a network with examiner device 102.

Targeted data 108 may include any one or more of files, folders, drives, or memory which are present on endpoint system 106. Targeted data 108 may be acquired by examiner device 102 in at least the form of a binary copy or copies of a physical drive or partition, logical copies of encrypted files, logical copies of unencrypted files, memory for specific processes, full RAM, and live system information. If a drive is encrypted, then the examiner can only view files which are the same as the target user sees. If the drive is unencrypted the files can be rebuilt and viewed as a file system which includes additional valuable information (e.g. a master file table, $MFT).

In an embodiment, to avoid encryption on the live devices, where the target drive is encrypted, the target drive is read via the operating system to get the data of off the target drive. If the target is not encrypted, the system uses binary interpretation of volume. Otherwise, this step is transparent to the user, the system performs on the Agent and the rest of the workflow continues.

Examiner device 102 may be a device with at least one processor and a memory, wherein the memory contains instructions and the at least one processor is configured to execute instructions for targeted data acquisition from a remote system. For example, the examiner device 102 may be a laptop or desktop computer. Examiner device 102 has sufficient bandwidth capabilities and storage to perform the tasks associated with targeted data acquisition, e.g. creating agent 104, deploying agent 104, receiving data from endpoint system 106.

Agent 104 is an executable program/process which may be created by examiner device 102. Creation of agent 104 by examiner device 102 may include configuring agent masking details, agent location details, and connectivity details. Agent 104 may also be created on another device and received by examiner device 102 before use. Agent 104 may be sufficiently small as to not use a noticeable amount of storage or processing power on the target endpoint system. For example, agent 104 may be less than 10 mB in size.

Agent 104 is deployed (solid arrow 112) by examiner device 102 to target endpoint system 106. Examiner device 102 and target endpoint system 106 are on a shared network 110, in order for agent 104 to be deployed to target endpoint system 106, and examiner device 102 may require administrator credentials/permissions on target endpoint system 106 to be able to deploy agent 104. Examiner device 102 configures deployment details including target endpoint system information such as username, password, IP address, and location to store agent on target endpoint system 106.

Once agent 104 is deployed onto target endpoint system 106, agent 104 attempts to connect to examiner device 102 repeatedly at a first defined interval of time, for example, every ten seconds. That is, depending on the configuration of agent 104 (e.g. the configuration at creation), agent 104 will attempt to connect to examiner device 102 every defined interval of time (e.g. ten seconds) until a connection 114 (dashed arrow) is successfully made. If connection 114 between agent 104 and examiner device 102 is lost, agent 104 will automatically resume attempts to connect to examiner device 102 repeatedly at the first defined interval of time until connection 114 is re-established. A connection attempt time-out limit may be set by the examiner and embedded in the agent 104 while agent 104 is being created. That is, the examiner may configure the agent 104 to stop attempting to make a connection to examiner device 102 after a specific amount of time.

In other embodiments, the examiner device 102 may be responsible for making a connection between the agent 104 and the examiner device 102.

Deployed agent 104 sends a viability signal or "heartbeat" to examiner device 102 repeatedly at a second defined interval of time, for example, every thirty seconds. This viability signal notifies examiner device 102 that agent 104 is still active or viable on target endpoint system 106. This viability signal serves to prevent a situation where agent 104 is inactive or disabled and can no longer attempt to make a connection with examiner device 102 but examiner device 102 has no means of recognizing the inactive status as anything other than a lack of a viable connection. The first defined interval of time may be the same, less than, or greater than the second defined interval of time. In other embodiments, a viability signal may be sent from the examiner device 102 to the agent 104, or both the examiner device 102 and the agent 104 may send viability signals.

Examiner device 102 requests targeted data 108 from deployed agent 104 once connection 114 has been made.

Examiner device 102 may request data from targeted locations (e.g. locations which are most likely to contain data of interest) on the target endpoint system 106. These targeted locations may be pre-selected. That is, an examiner or other user of targeted data acquisition system 100 may customize "packages" of the targeted locations which are of interest in specific types of investigations. Examiner device 102 may have stored in the memory data and/or instructions which when executed by the at least one processor of examiner device 102 request data from the specific pre-selected targeted locations on target endpoint system 106. For example, targeted locations may include all user documents (C:\users\user_name\documents\*.*) or a master file table ($MFT). The examiner can choose a number of specific targeted locations from a pre-selected list of targeted locations.

In some embodiments, agent 104 may have been configured prior to deployment to locate pre-selected targeted data 108, such that once connection 114 is established, the agent 104 can immediately send the pre-selected target data 108.

Examiner device 102 may request data from specific files/folders or drives on target endpoint system 106. Examiner device 102 may request data based on specific filters, for example hashes or extensions. These requests may be based on targeted data 108 which was previously received from agent 104. For example, if the examiner has received and viewed a master file table of target endpoint system 106, they may then request specific files, folders, data, or drives of interest based on what is contained in the master file table.

Examiner device 102 may request data regarding the memory processes of target endpoint system 106.

The examiner may make as many requests for data as is required to acquire the necessary targeted data 108. That is, at least a second set of data may be requested and acquired in the course of an investigation and the second set of data may or may not be requested based of a previously acquired first set of data. Any subsequent sets of data may or may not be based on previously acquired sets of data.

Once examiner device 102 has received targeted data 108, downloading of targeted data is represented by arrow 116 (dot-dot-dash arrow), the data may be added to the evidence sources for the particular case. That is, targeted data 108 may be stored in a chosen location on examiner device 102 with or without other materials relevant to the examiner's investigation.

Upon completion of the acquisition of targeted data 108, agent 104 may either be deleted from target endpoint system 106 or may remain on target endpoint system 106.

In other embodiments of a targeted data acquisition system, a third party device or "broker" may act as an intermediary for steps between the examiner device and the agent. For example, the examiner device 102 may create the agent 104 but then have another device deploy the agent to the target endpoint system 106. In another example, the agent 104 may send the targeted data to a device other than the examiner device 102 which has more storage capacity.

In the embodiment of FIG. 1, the agent 104 is created and deployed in an ad hoc manner. In other embodiments of a targeted data acquisition system, the agent 104 may be deployed to any or all devices within a network prior to initiation of an investigation. For example, a company may place the agent 104 on all laptops, mobile phones, tablets, etc., before the devices are given to employees. When an investigation is required the examiner device 102 may initiate a connection with the agent 104 (which is already present on the target endpoint system 106, i.e. already deployed) or send a signal to "turn on" the agent 104 on the target endpoint system 106.

Targeted data acquisition system 100 may be configured to acquire data from a plurality of operating systems, including Windows, Mac, Linux, iOS, or Android.

Figure 2:
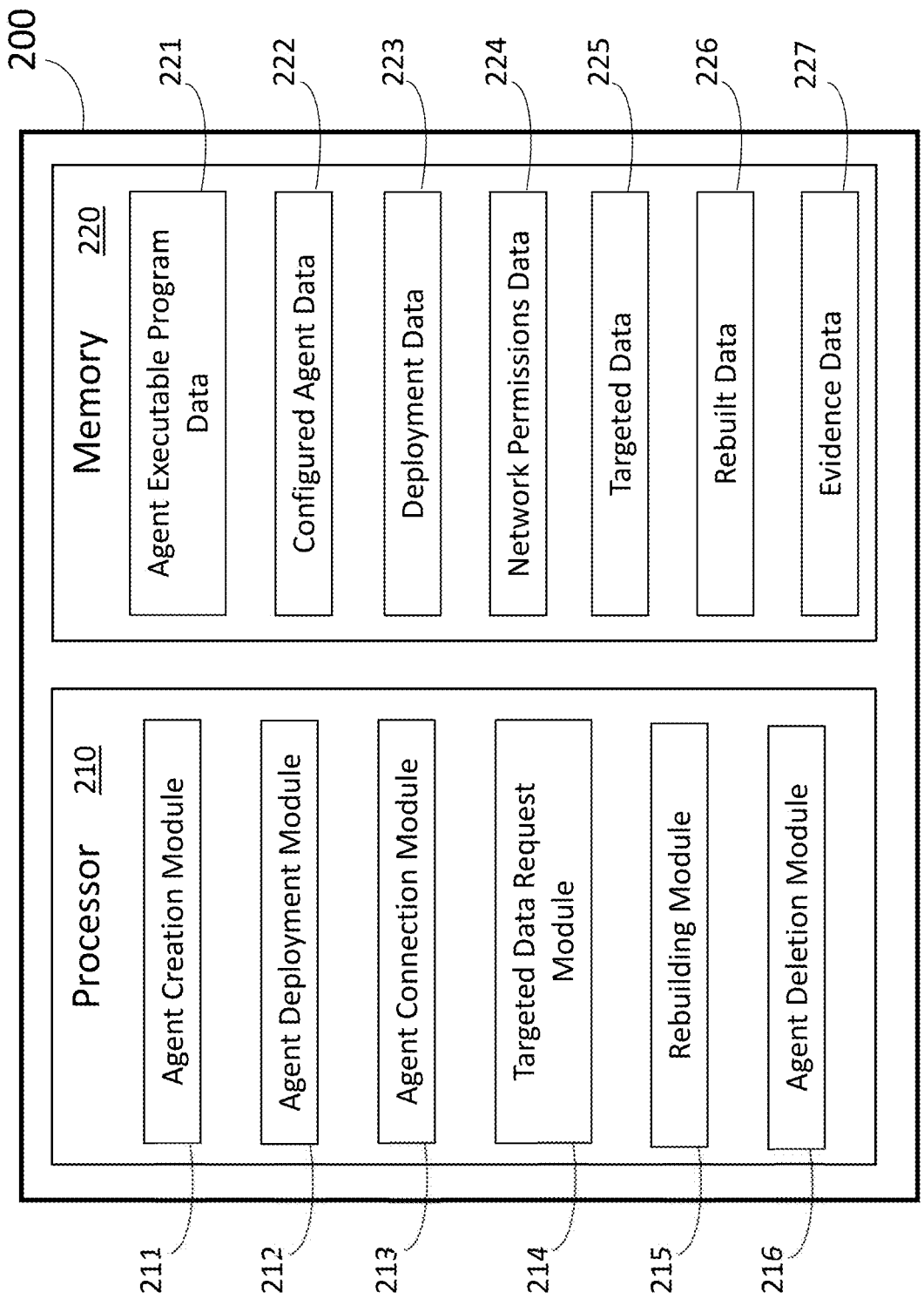
FIG. 2 is a block diagram of an examiner device for targeted data acquisition from a remote endpoint system using an agent, in accordance with the present systems, devices, and methods.

FIG. 2 is a block diagram of an examiner device 200 for targeted data acquisition from a remote endpoint system using an agent, in accordance with the present systems, devices, and methods.

Examiner device 200 is used by an examiner to investigate targeted data on a target's (person or people of interest) device. The examiner creates an agent in the form of an executable program which is deployed to the target endpoint system on a remote computing device (laptop, desktop, mobile phone, etc.) to locate and send targeted data to examiner device 200.

Examiner device 200 includes a processor 210 and a memory 220. Processor 210 is in communication with memory 220. Examiner device 200 may include other components beyond processor 210 and memory 220.

Memory 220 may have instructions stored thereon which, upon execution by the processor 210, cause examiner device 200 to perform the functions of methods or processes discussed herein. Processor 210 may include more modules and memory 220 may include more data than described herein.

Processor 210 includes an agent creation module 211, an agent deployment module 212, and agent connection module 213, a targeted data acquisition module 214, a rebuilding module 215, and an agent deletion module 216. Memory 220 may include agent executable program data 221, configured agent data 222, deployment data 223, network permissions data 224, targeted data 225, rebuilt data 226, and evidence data 227.

The examiner provides configuration information to agent creation module 211 to create the agent. The executable program of an "original" agent exists on examiner device 200 as agent executable program data 221. The executable program requires configuration by the examiner before it can be deployed. The examiner creates a configured agent from the "original" agent. The configuration information includes agent masking details, location details, and connectivity details. Agent masking details may include such information as the name of the agent, the agent title, the agent company, an agent description, etc. The agent location details may include the location on the examiner device where the agent will exist and the filepath of the agent on the examiner device. The connectivity details may include the IP address, or host name, or machine name of the examiner device (or other means of identifying the examiner device), a port for connection, the timing for connection attempts (reconnect delay), and a time interval at which connection attempts are stopped (disconnected keep alive).

When the agent is created by agent creation module 211, the configuration details as well as other data associated with the agent are stored in memory 220 as configured agent data 222.

The agent may then be deployed to the target endpoint system by agent deployment module 212. The examiner provides target endpoint system information to agent deployment module 212. The target endpoint system information may include the IP address, host name, and/or machine name of the target endpoint system, the username for the target endpoint system (there may be multiple user profiles on a single device, may be a user name for an administrator account the examiner is using to log in to the endpoint device, the user account having local administrative permissions on the endpoint device), the password for the target endpoint system, and the location on the target endpoint system where the agent will exist/be stored (e.g. C:\Windows\Temp). The target endpoint system information and data required for deployment of the agent is stored in memory 220 as deployment data 223.

Deployment of the agent to the target endpoint system may require network permissions. Network permissions data 224 is stored in memory 220 and is accessed by agent deployment module 212 if necessary.

Once the agent is deployed and active on the target endpoint system, a connection between examiner device 200 and the agent is established. The agent may continually make connection attempts until agent connection module 213 is activated on examiner device 200 and a successful connection is made.

After establishment of the connection, the examiner can use targeted data request module 214 to request specific data from the target endpoint system through the agent. The targeted data may be downloaded in the form of a binary copy or copies of a physical drive or partition, logical copies of encrypted files (examiner device only gets files the target user can see or "viewable" files), logical copies of unencrypted files which can be rebuilt and viewed as a file system which includes additional valuable information (e.g. a master file table, $MFT), memory for specific processes, full RAM, and live system information. The examiner device may request and download a number of sets of data throughout an investigation and requests for sets of data may or may not be based on information from previously acquired sets of data. Downloaded targeted data is stored in memory 220 as targeted data 225.

As mentioned above, if a drive is unencrypted, targeted data may be acquired in the form of logical copies of files which may be rebuilt to reveal additional valuable pieces of evidence. Files may also be rebuilt from physical binary data which is acquired from the target endpoint system (this helps to avoid evidence of outside access of files on the target endpoint system). Rebuilding module 215 may access targeted data 225 from memory 220 and perform these rebuilding tasks. Outputs from rebuilding module 215 may be stored in memory 220 as rebuilt data 226.

When the examiner has acquired the necessary targeted data to complete their investigation the agent may be deleted from the target endpoint system by agent deletion module 216.

Any or all targeted data of interest, in the original downloaded form or in a rebuilt form, may then be stored in memory 220, alongside evidence in the investigation from other sources, as evidence data 227.

Figure 3:
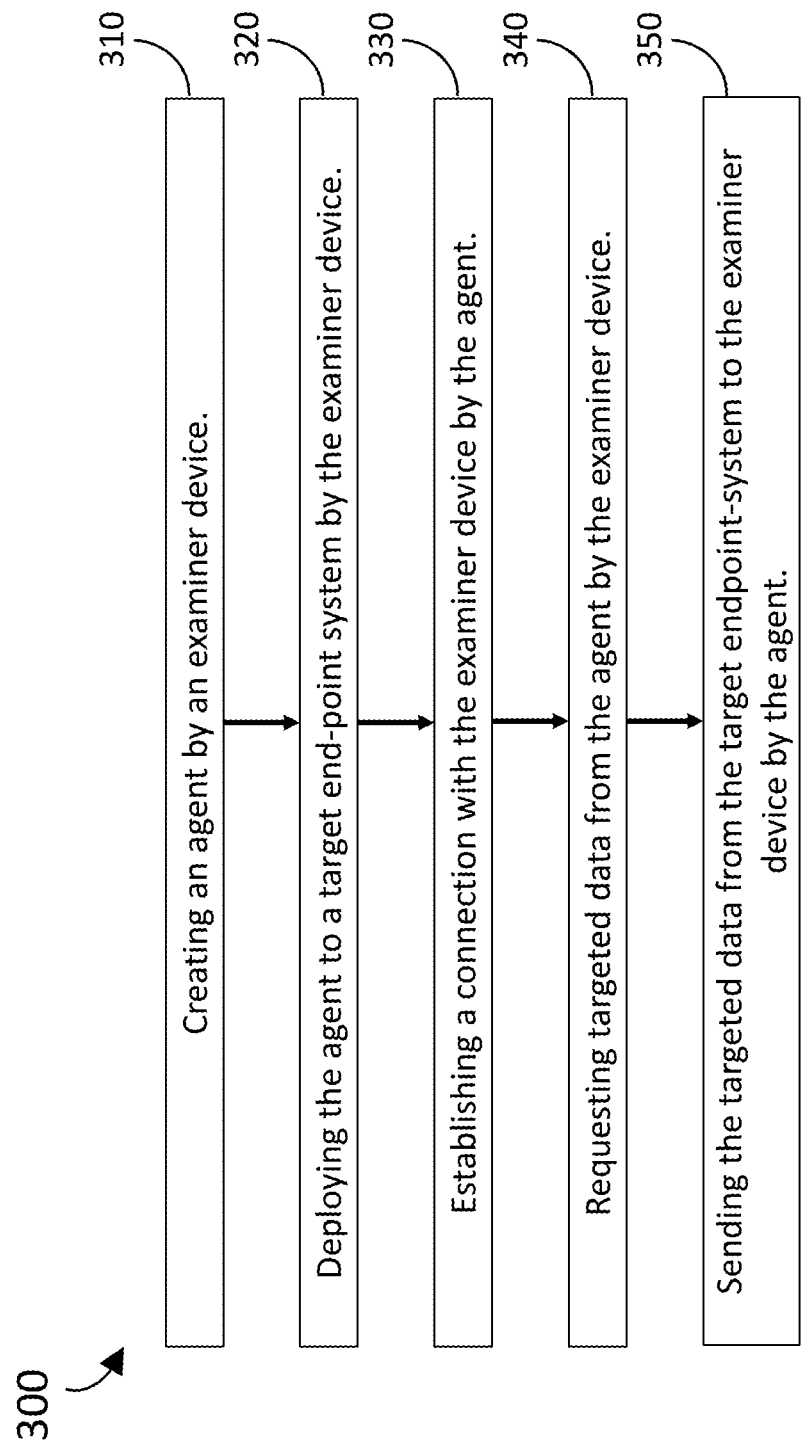
FIG. 3 is a flow diagram of a method of acquiring targeted data from a target endpoint system using an agent by an examiner device having at least one processor and a memory, in accordance with the present systems, devices, and methods.

FIG. 3 is a flow diagram of a method 300 of acquiring targeted data from a remote target endpoint system using an agent by an examiner device having at least one processor and a memory, in accordance with the present systems, devices, and methods. A targeted acquisition system (examiner device, agent, and targeted endpoint system) performing the method may be for example the targeted data acquisition system 100 from FIG. 1. Method 300 includes several acts, in alternative embodiments certain acts may be omitted and/or additional acts may be added. The illustrated order of the acts is shown for exemplary purposes only and may change in alternative embodiments.

At 310, an agent is created by an examiner device. The agent may be, for example, agent 104 of FIG. 1 and the examiner device may be, for example, examiner device 102 of FIG. 1. The agent is an executable program configured to locate and send targeted data from a target endpoint system. The examiner device may be a computing device having at least one processor and a memory, wherein the memory includes data and/or instructions which can be executed by the at least one processor. The target endpoint system may be part of a device which is used by a target and stores data. The examiner device and the target endpoint device share a network. The target endpoint device does not need to always be connected to the network for the target acquisition system to function.

At 320, the agent is deployed to the target endpoint system by the examiner device. The examiner device configures deployment details for the agent such as the IP address of the target endpoint system, the user name for the target endpoint system (there may be multiple user profiles on a single device), the password for the target endpoint system, and the location on the target endpoint system where the agent is to be stored. Once configured the examiner device sends or uploads the agent to the target endpoint system. Once the agent is deployed, the agent may launch automatically or the examiner device may send a signal to cause the agent to launch.

At 330, the agent establishes a connection to the examiner device from the target endpoint system. During creation the agent is configured to attempt to establish a connection with the examiner device repeatedly at a first defined interval of time (e.g. every 10 seconds) until a connection is successfully established. If a connection is lost the agent will automatically attempt to make a connection with the examiner device again. The agent may also have been configured to "time-out" or stop making connection attempts after a certain amount of time if a connection is not established. For example, the agent may stop attempting to make a connection after 24 hours.

At 340, the examiner device requests targeted data of the target endpoint system from the agent. Once a connection is established an examiner using the examiner device may request targeted data of the target endpoint system from the agent. This targeted data may include specific data from targeted locations which are known to be of value in most investigations, as described in discussion of FIG. 1. This targeted data may also include specific files, folders, drives, or memory processes.

At 350, the targeted data is sent to the examiner device by the agent. The targeted data is in the form of physical (binary data) copies or logical copies and not as fragments or artifacts which need to be reconstructed to be valuable and therefore the targeted data is admissible in legal proceedings. The examiner device may request and download a number of sets of data throughout an investigation and requests for sets of data may or may not be based on information from previously acquired sets of data.

Figure 4A:
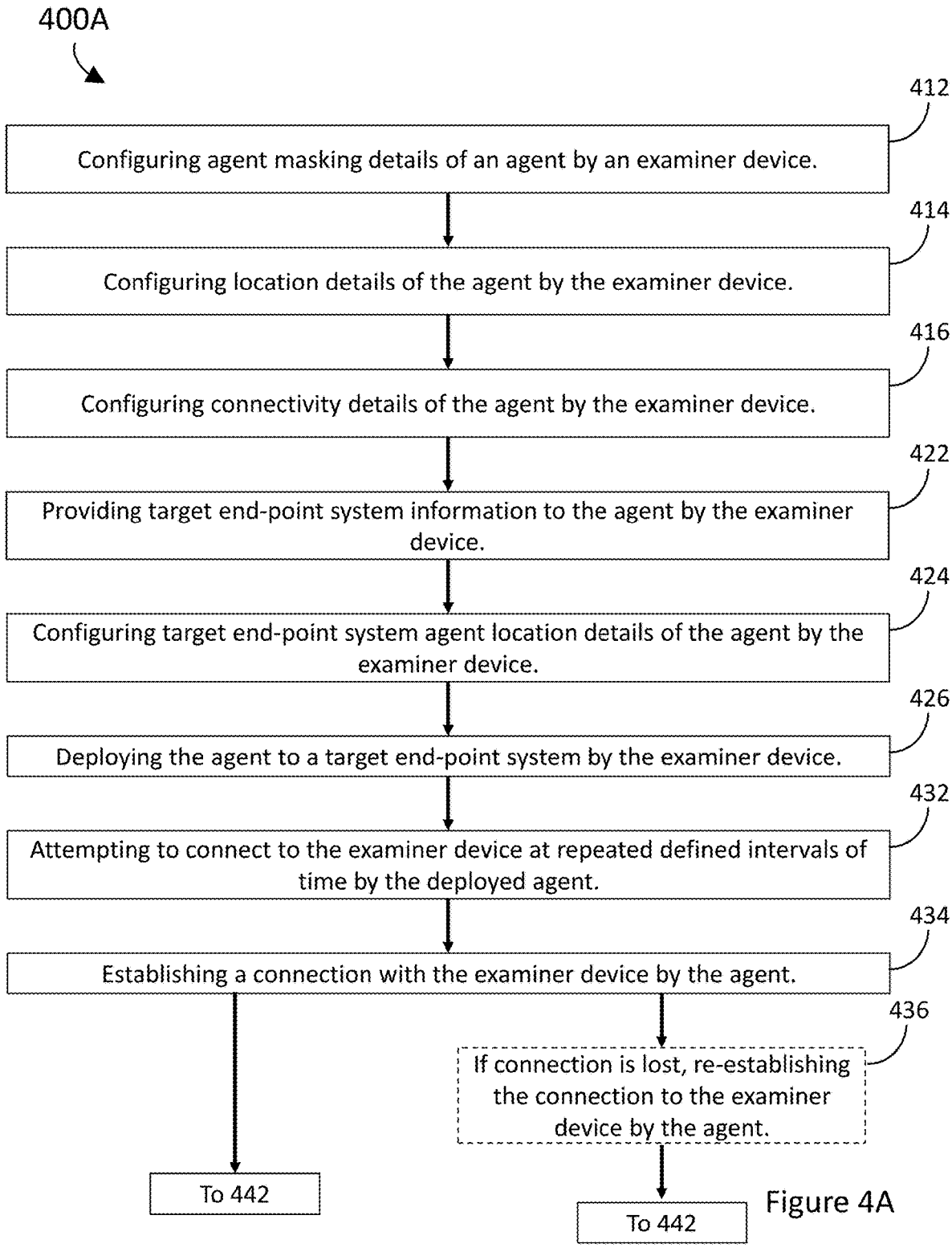
FIGS. 4A and 4B are a flow-diagram of a method of acquiring targeted data from a target endpoint system using an agent created by an examiner device having at least one processor and memory, in accordance with the present systems devices, and methods.
Figure 4B:
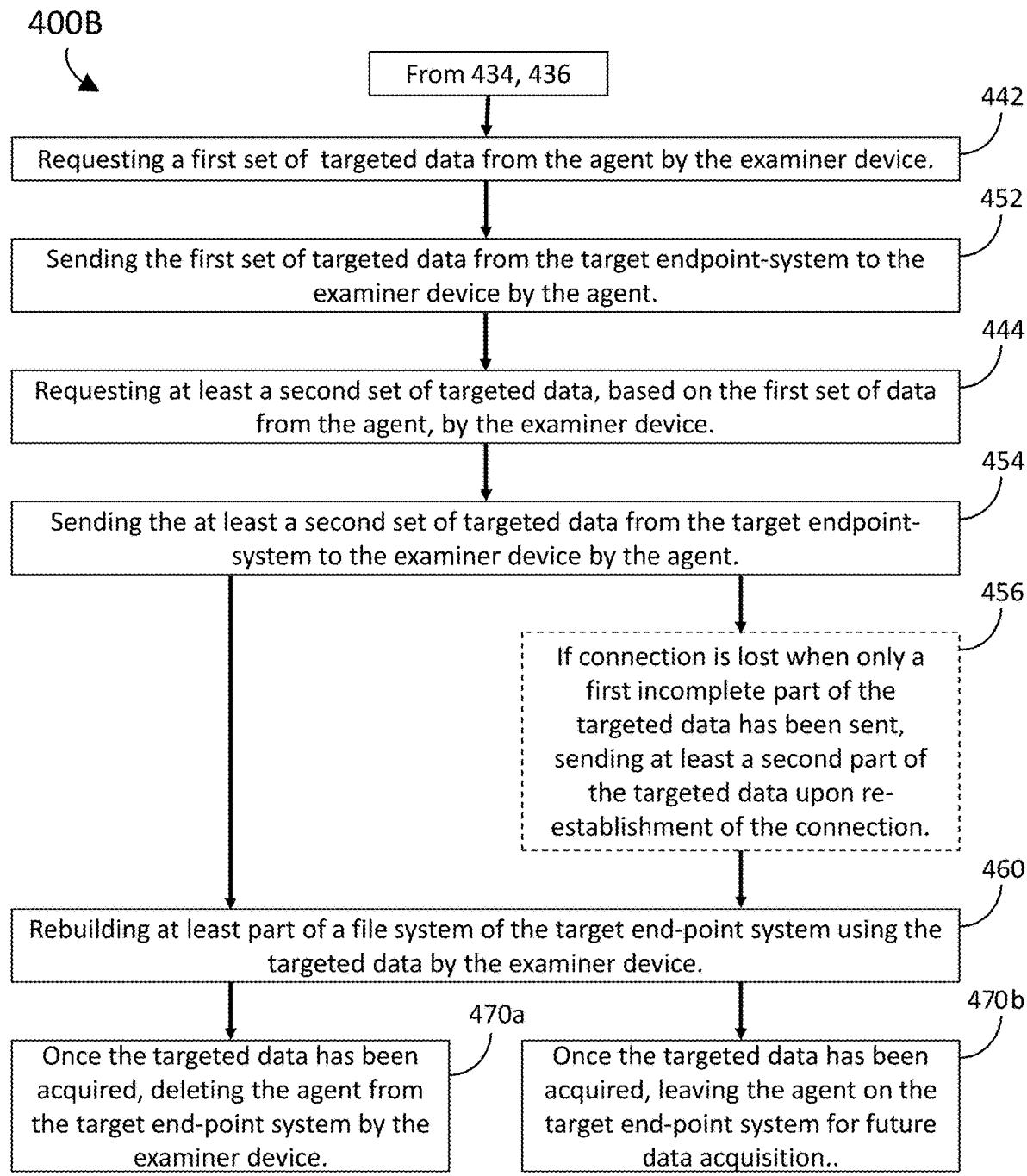

FIGS. 4A and 4B are a flow-diagram of a detailed method 400A, 400B of an embodiment of acquiring targeted data from a target endpoint system using an agent created by an examiner device having at least one processor and memory, in accordance with the present systems devices, and methods. The system performing the method may be, for example, the targeted data acquisition system 100 from FIG. 1. Method 400A, 400B may include acts similar to acts in method 300.

Acts in method 400A, 400B with the same middle digit as acts in method 300 may be involved in the same process. For example, steps 412, 414, and 416 are involved in agent creation as represented by act 310 in method 300. Method 4400A, 400B 00 includes several acts, though in alternative embodiments certain acts may be omitted and/or additional acts may be added. The illustrated order of the acts is shown for exemplary purposes only and may change in alternative embodiments.

The targeted data acquisition system of method 400A, 400B includes an examiner device, an agent, and a target endpoint system. The agent may be, for example, agent 104 of FIG. 1 and the agent discussed in FIG. 3 and the examiner device may be, for example, examiner device 102 of FIG. 1 and the examiner device discussed in FIG. 3. The agent is an executable program configured to locate and send targeted data from a target endpoint system. The examiner device may be a computing device having at least one processor and a memory, wherein the memory includes data and/or instructions which can be executed by the at least one processor. The target endpoint system may be part of a device which is used by a target and stores data. The examiner device and the target endpoint device share a network. The target endpoint device does not need to be connected to the network for the target acquisition system to function.

At 412, agent masking details of an agent are configured by an examiner device. The agent masking details may include such information as the name of the agent (file name or executable name), the agent title, the agent company, an agent description (file description as it may appear in the application properties), etc. The agent name may be something which would not draw attention from the user of the target device.

At 414, agent location details of an agent are configured by an examiner device. The agent location details describe where the agent is stored on the examiner device. The agent location details may include a folder name and a file path. The folder name may be the name of the folder where the agent is to be stored. In some cases, a default folder name may be generated which is a combination of the agent file name and the date and time at which the agent was created by the examiner. The file path is the location where the agent is to be stored on the examiner device.

At 416, agent connectivity details of an agent are configured by an examiner device. The connectivity details may include the IP address, hostname, or machine name of the examiner device, a port for connection (a port on the examiner device that the targeted data acquisition process will bind to locally, which may be a port that is not reserved by another process or is not currently in use), the timing for connection attempts, and a time interval at which connection attempts are stopped. The target IP may be set to be internet facing.

At 422, target endpoint system information is provided to the agent by the examiner device. The target endpoint system information may include an IP address, host name, or machine name of the target endpoint system, a username for the target endpoint system (there may be multiple user profiles on a single device), and a password for the target endpoint system.

At 424, target endpoint system agent location details are provided to the agent by the examiner device. Target endpoint system agent location details include the location on the target endpoint system where the agent will be stored. The location may be one where the user of the target endpoint system is not likely to look or a location that is not easy to find.

At 426, the configured agent is deployed to the target endpoint system. That is, the agent is downloaded onto the target endpoint system to the location chosen by the examiner. The agent may launch or become active on the target endpoint system automatically or the examiner device may send a signal to cause the agent to become active.

At 432, the agent attempts to connect to the examiner device by sending out connection attempts repeatedly and at a first defined interval of time. During creation the agent is configured to attempt to establish a connection with the examiner device repeatedly at a first defined interval of time (e.g. every 10 seconds) until a connection is successfully established. If a connection is lost the agent will automatically attempt to make a connection with the examiner device again. The agent may also have been configured to "timeout" or stop making connection attempts after a certain amount of time if a connection is not established. For example, the agent may stop attempting to make a connection after 24 hours.

In some embodiments, an additional act (not shown in FIG. 4) occurs, wherein the deployed agent also sends a viability signal to examiner device repeatedly at a second defined interval of time, for example, every thirty seconds. This viability signal notifies the examiner device that the agent is still active or viable on the target endpoint system. This viability signal serves to prevent a situation where the agent is inactive or disabled and can no longer attempt to make a connection with the examiner device but the examiner device has no connection to recognize the inactive status as anything other than a lack of a viable connection. The first defined interval of time may be the same, less than, or greater than the second defined interval of time. In other embodiments, a viability signal may be sent from the examiner device to the agent, or both the examiner and the agent may send viability signals.

At 434, a connection is successfully established between the agent and the examiner device.

Act 436 is an optional step which occurs if the connection between the agent and the examiner device is lost. In the event of a loss of connection the agent will automatically attempt to re-establish the connection, again by sending out connection attempts repeatedly and at the first defined interval of time. Act 436 only occurs if the connection is lost. If the connection is not lost the method proceeds directly from act 434 to act 442.

At 442, a first set of targeted data on the target endpoint system is requested from the agent by the examiner device. This targeted data may include specific data from targeted locations which are known to be of value in most investigations, as described in discussion of FIG. 1. This targeted data may also include specific files, folders, drives, or memory processes.

At 452, the first set of targeted data is sent from the target endpoint system by the agent and downloaded by the examiner device. If all of the targeted data required is acquired at this point the examiner may end the investigation here and move to step 470.

At 444, at least a second set of targeted data from the target endpoint system is requested from the agent by the examiner device.

At 454 the at least a second set of targeted data is sent from the target endpoint system by the agent and downloaded by the examiner device. The examiner device may request and download a number of sets of data throughout an investigation and requests for sets of data may or may not be based on information from previously acquired sets of data.

Act 456 is an optional step which occurs if the connection between the agent and the examiner device is lost while targeted data is being downloaded by the examiner device. Upon re-establishment of the connection between the agent and the examiner device the download of the particular set of targeted data which was being transferred may resume from the point of loss of connection. That is, if a first part of the targeted data was already downloaded by the examiner device the download may skip the first part and start downloading a second part of the targeted data. No data would be downloaded in duplicate from the target endpoint system to the examiner device. If the connection is not lost the method proceeds directly from act 454 to act 460.

At 460, in some cases, a file system of the target endpoint system may be rebuilt using targeted data downloaded from the target endpoint system by the examiner device. This targeted data may be from a set of data received by the examiner device. This file system would be rebuilt from physical binary data received by the examiner device. In other cases, this step may not be required. A benefit of rebuilding the file system on the examiner device is that the examiner device now has access to the files but the "time accessed" information for the original file on the target endpoint system will not be changed. That is, rebuilding the file system on the examiner device, or another device, leaves less evidence that an investigation has occurred on the target endpoint system. Additionally, rebuilding the file system may provide access to files and data that would otherwise be unavailable.

Once the examiner device has acquired all the targeted data requested, the agent is deleted from the target endpoint system, at 470*a*. Alternatively, the agent remains on the target endpoint system for future investigations, at 470*b*.

Figure 5A:
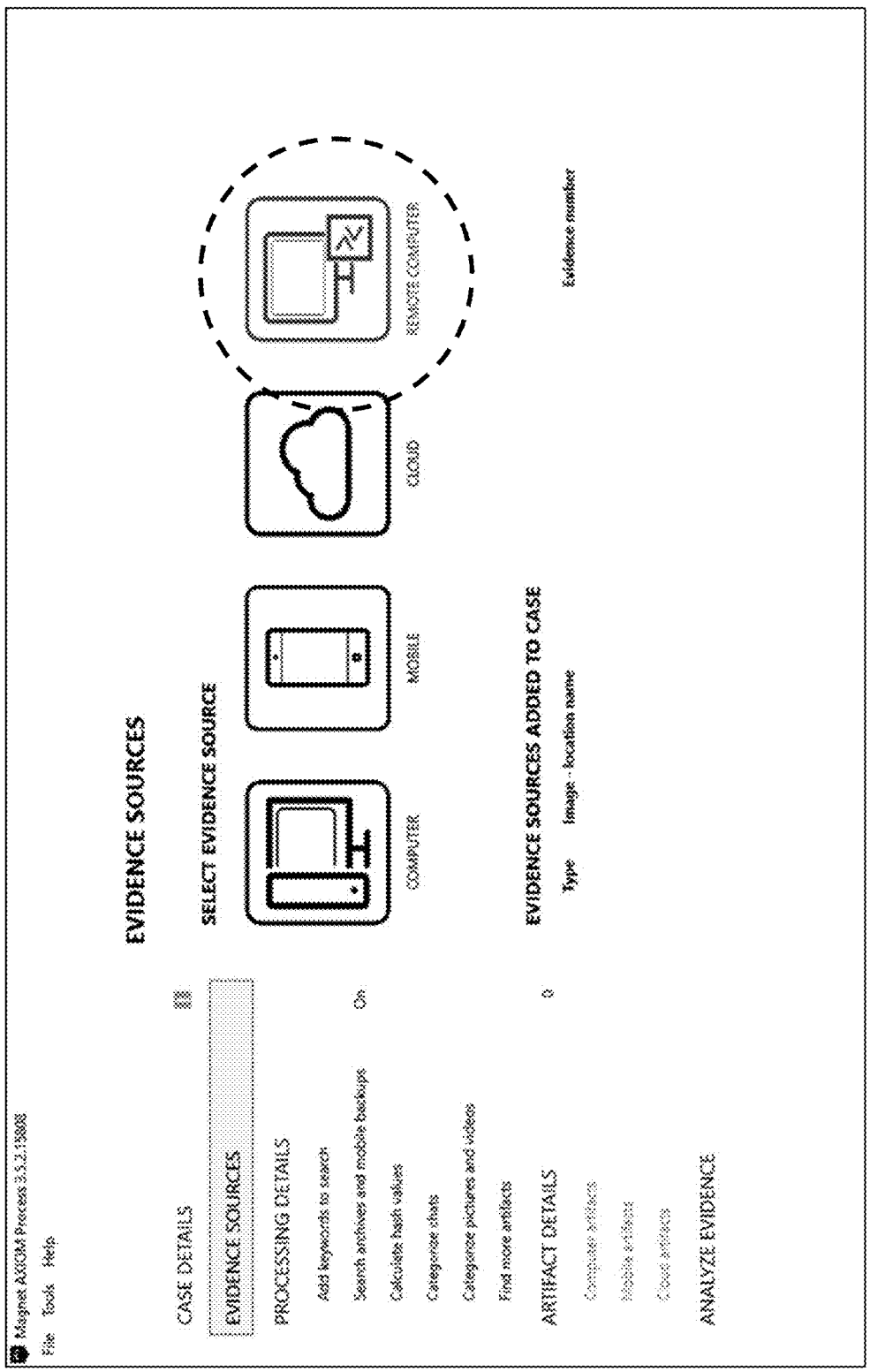
FIG. 5A is an image of a screen from the process of targeted data acquisition, in accordance with the present systems, devices, and methods.
Figure 5C:
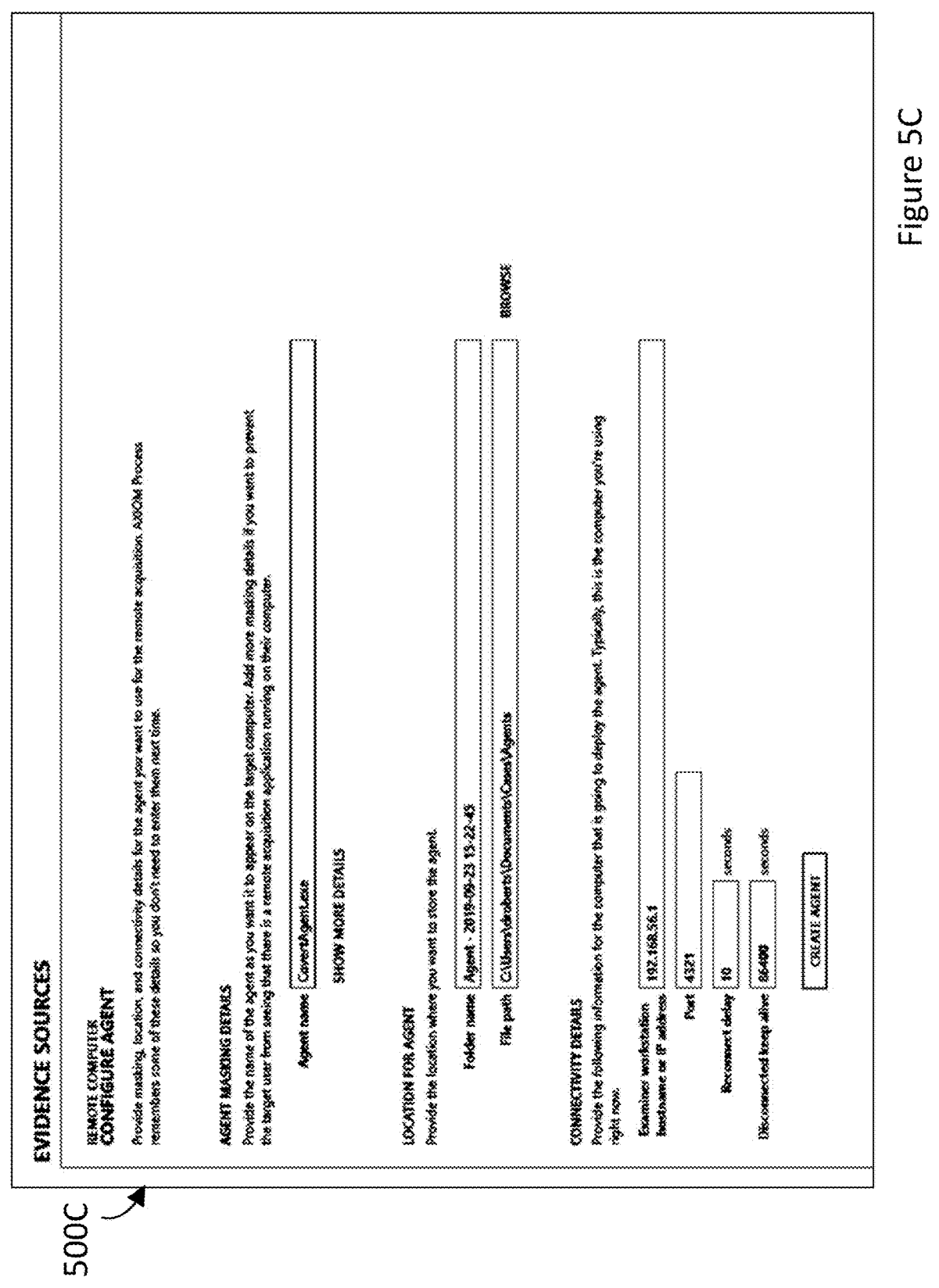
Figure 5D:
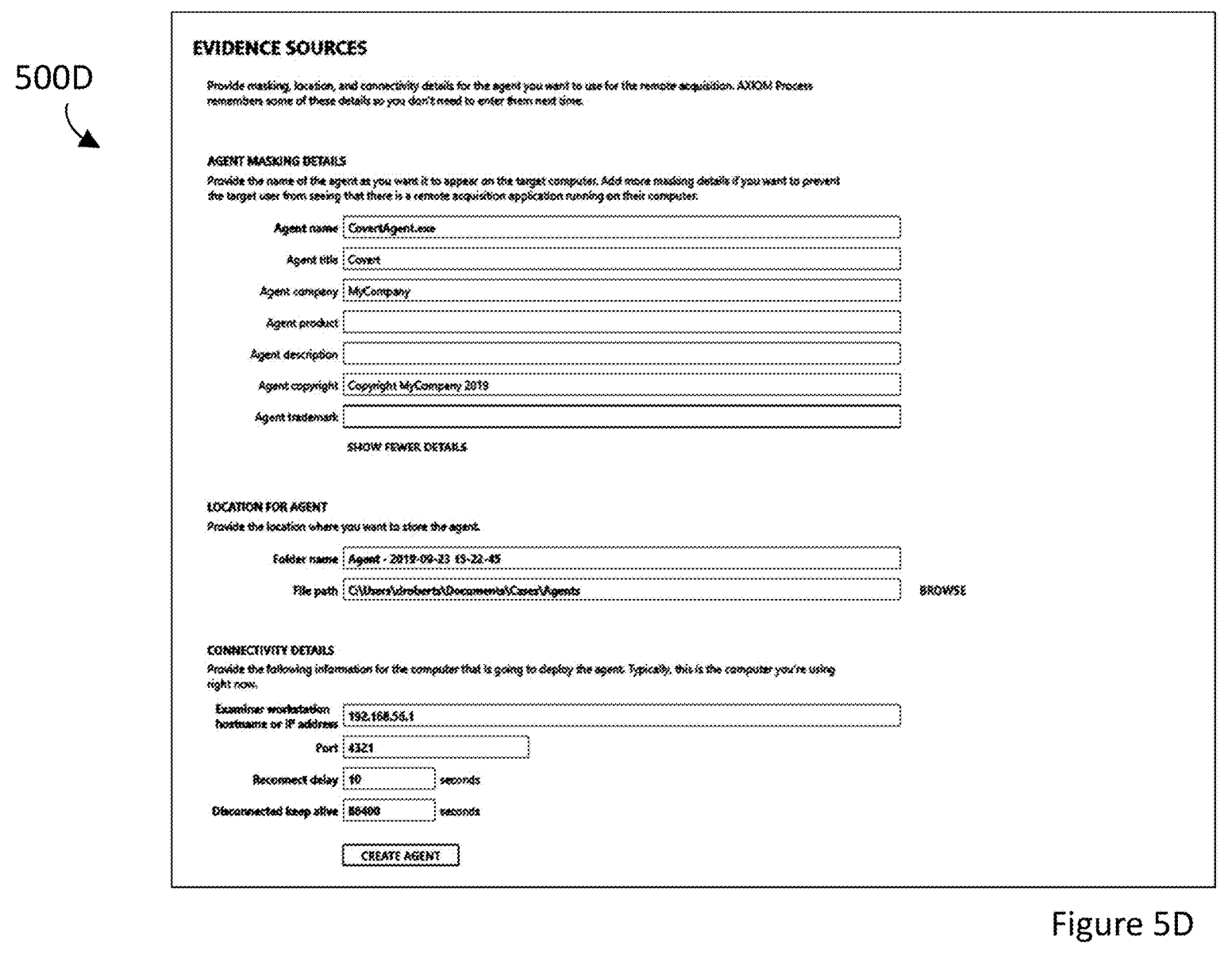
Figure 5F:
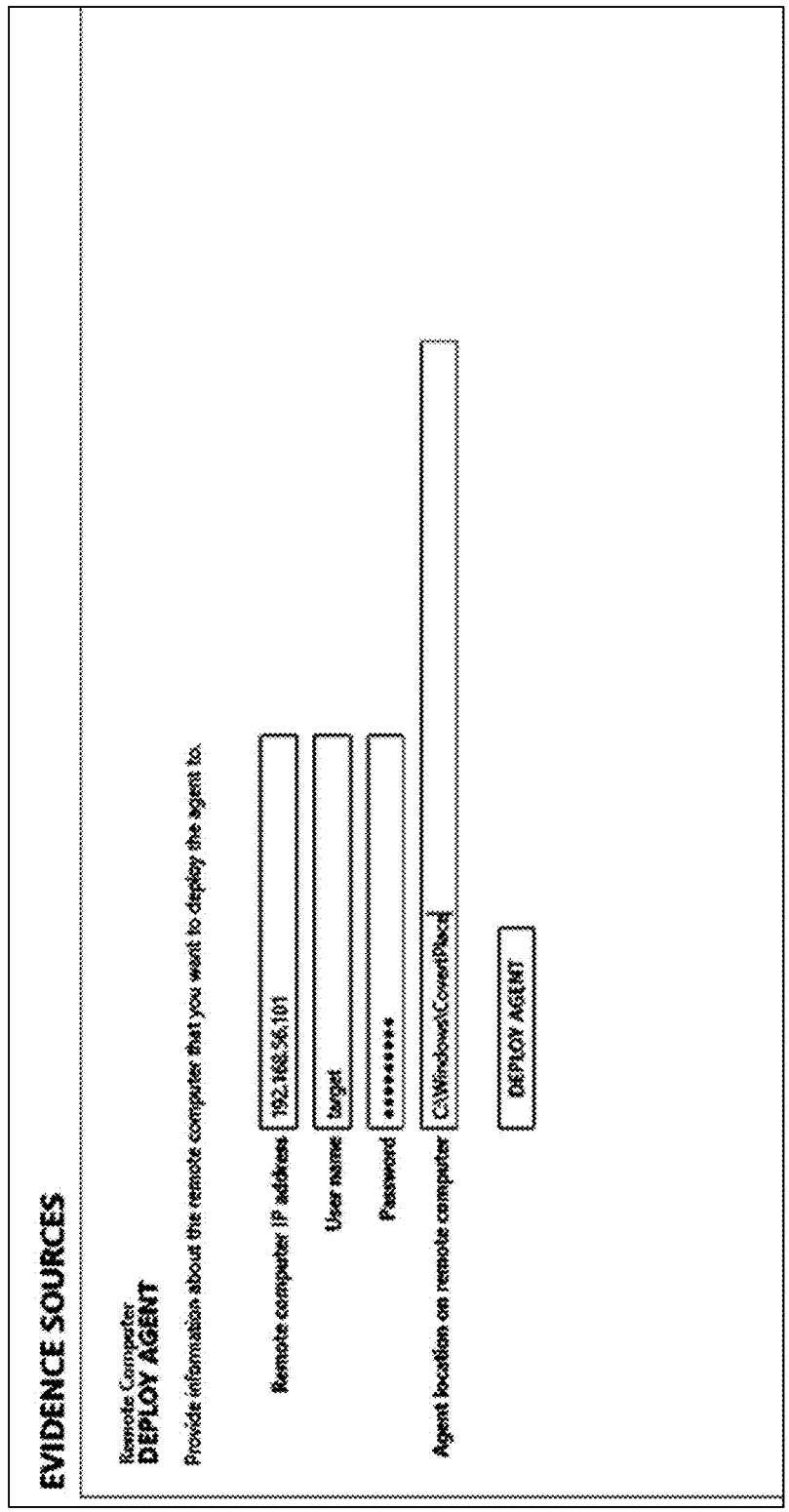
FIG. 5F is an image of a screen from the process of targeted data acquisition, in accordance with the present systems, devices, and methods.
Figure 5G:
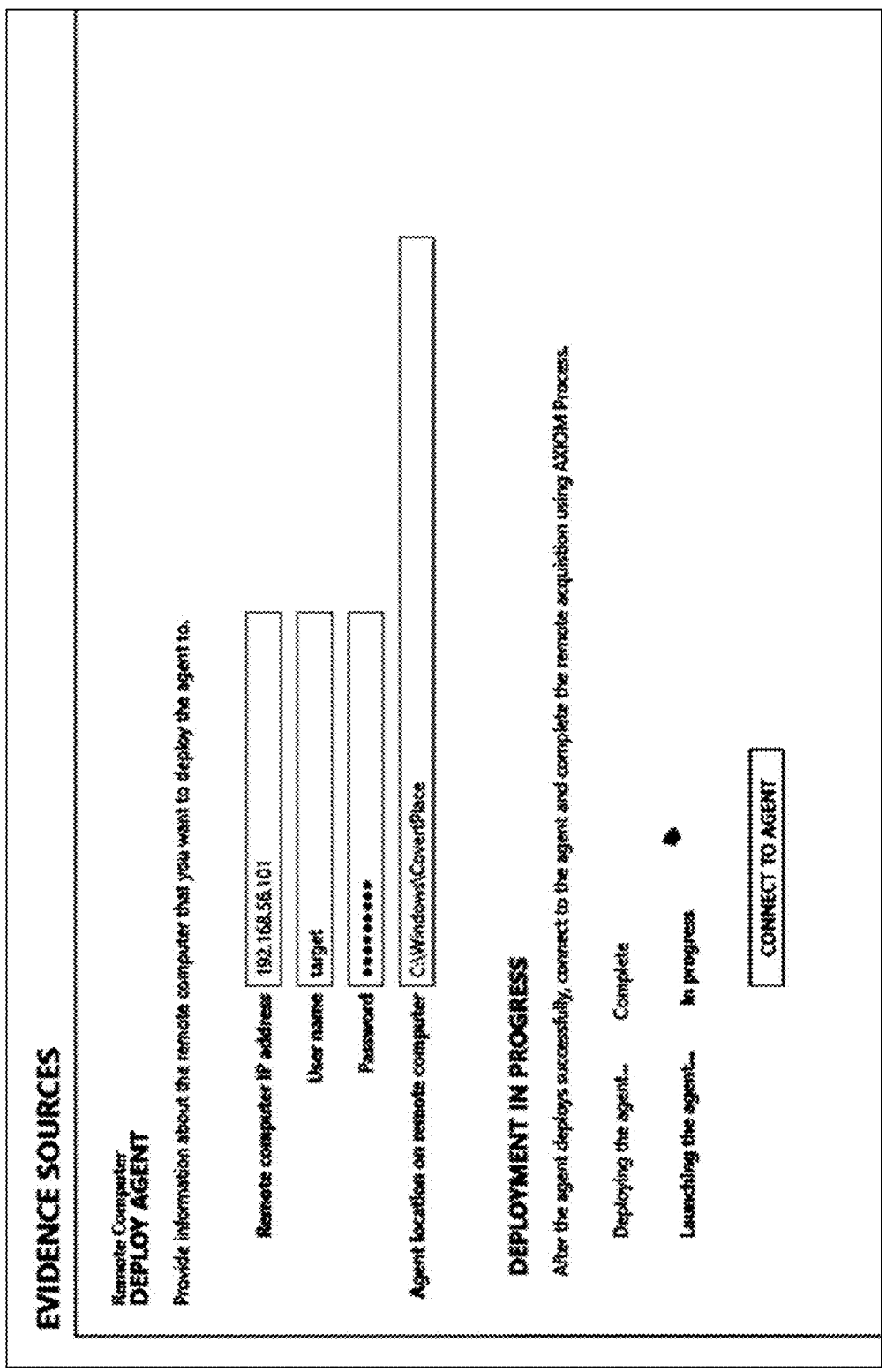
FIG. 5G is an image of a screen from the process of targeted data acquisition, in accordance with the present systems, devices, and methods.
Figure 5H:
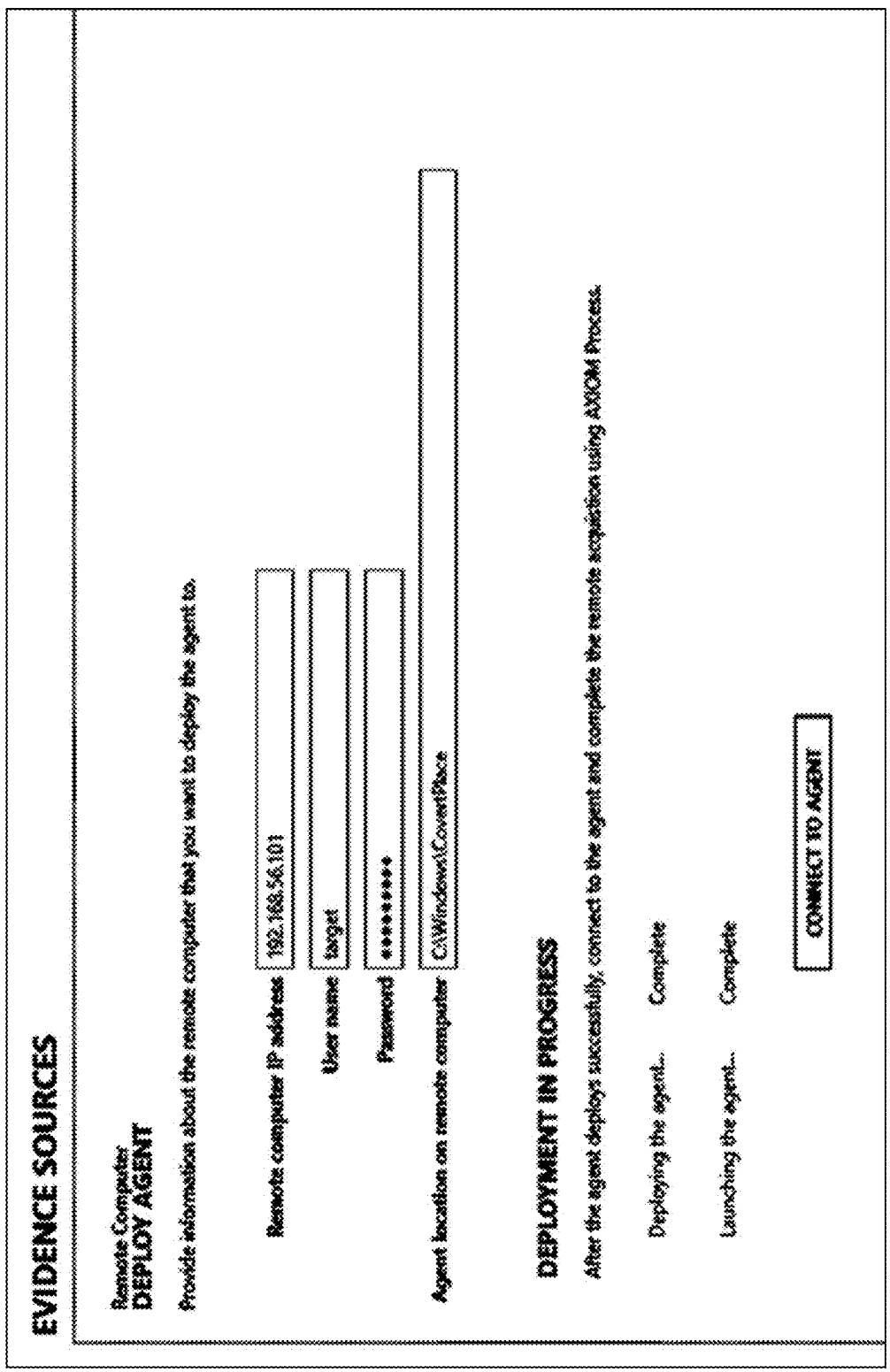
FIG. 5H is an image of a screen from the process of targeted data acquisition, in accordance with the present systems, devices, and methods.
Figure 5I:
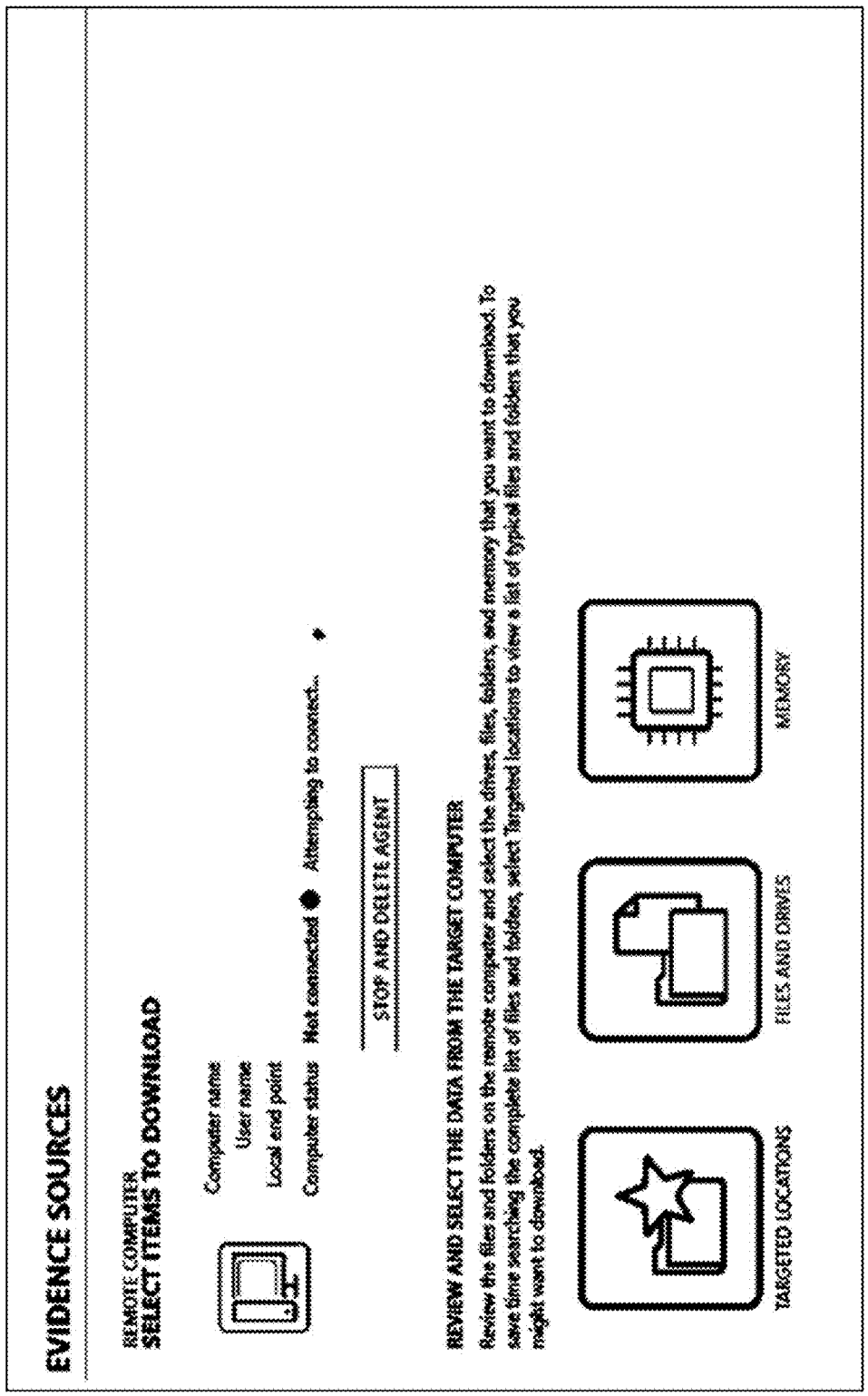
FIG. 5I is an image of a screen from the process of targeted data acquisition, in accordance with the present systems, devices, and methods.
Figure 5J:
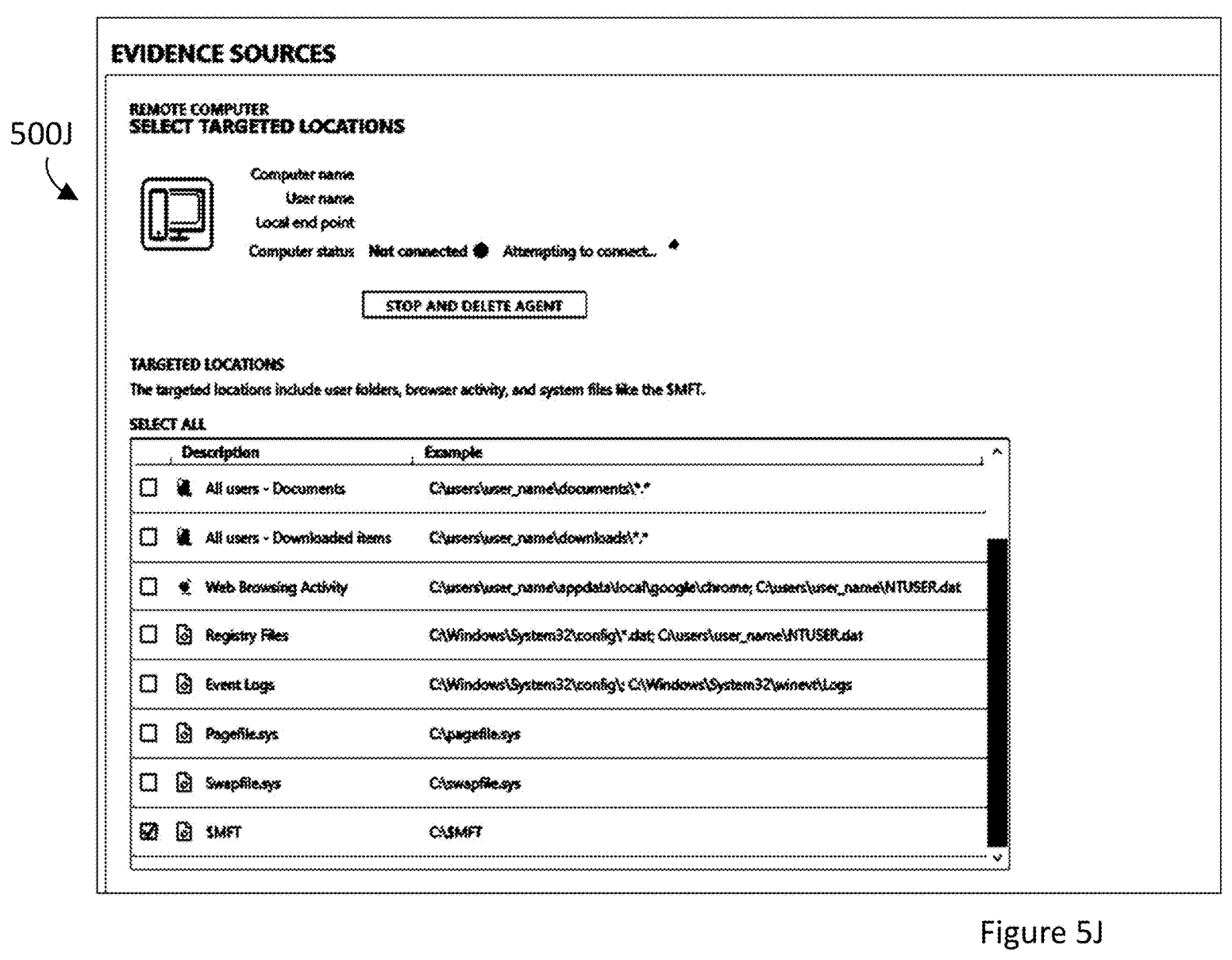
Figure 5K:
FIG. 5K is an image of a screen from the process of targeted data acquisition, in accordance with the present systems, devices, and methods.
Figure 5L:
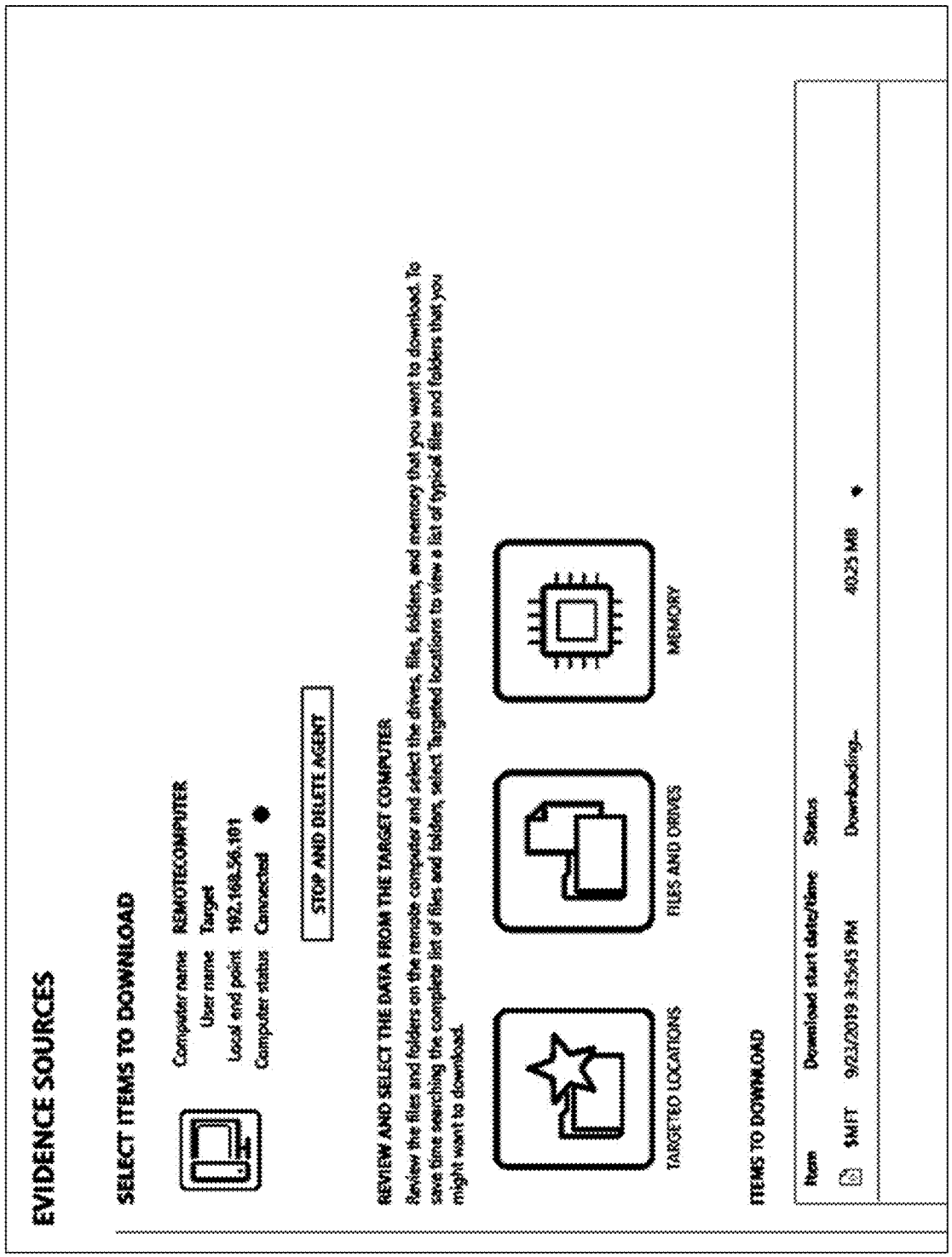
FIG. 5L is an image of a screen from the process of targeted data acquisition, in accordance with the present systems, devices, and methods.
Figure 5M:
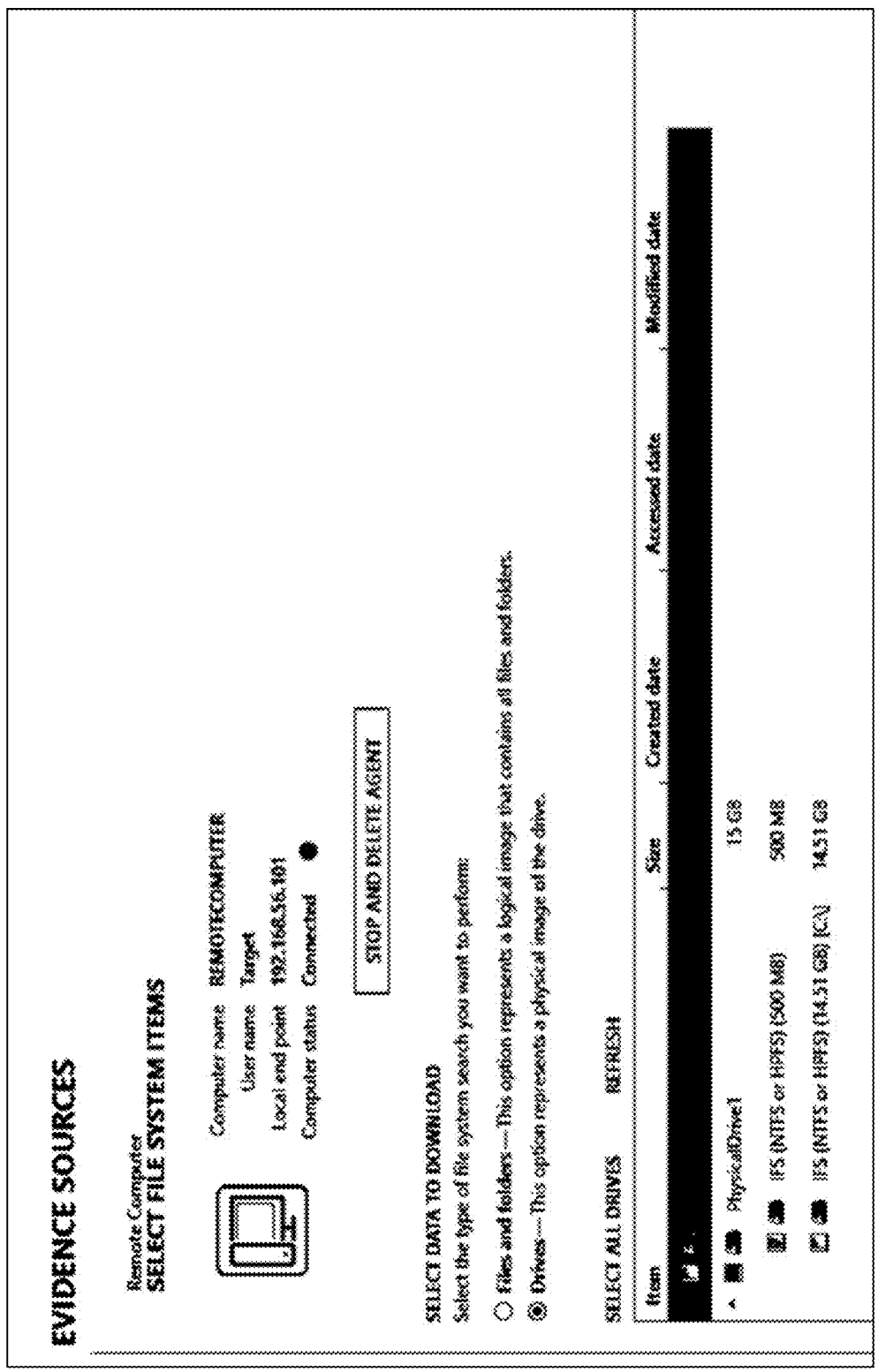
FIG. 5M is an image of a screen from the process of targeted data acquisition, in accordance with the present systems, devices, and methods.
Figure 5N:
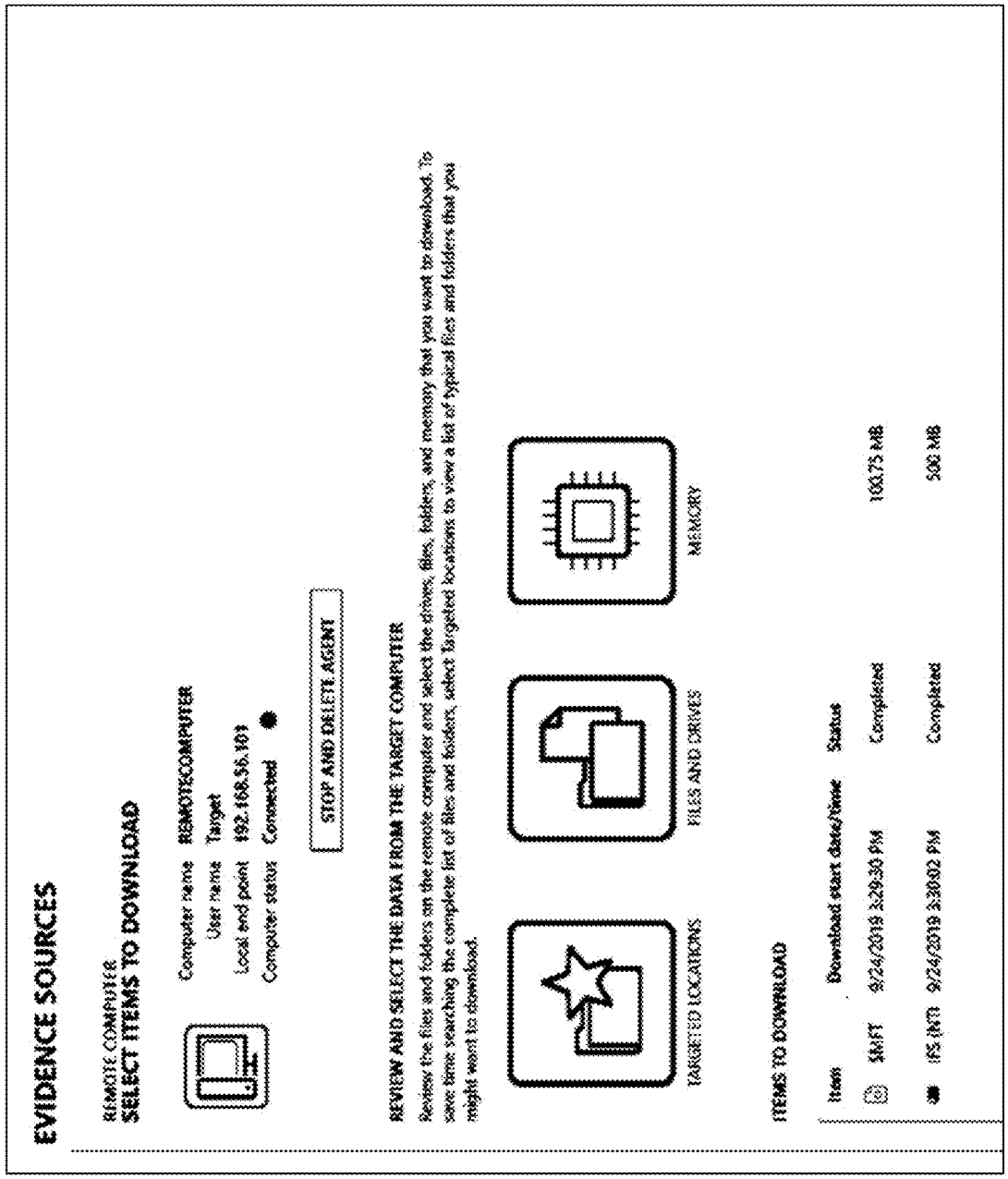
FIG. 5N is an image of a screen from the process of targeted data acquisition, in accordance with the present systems, devices, and methods.
Figure 50:
Figure 5Q:
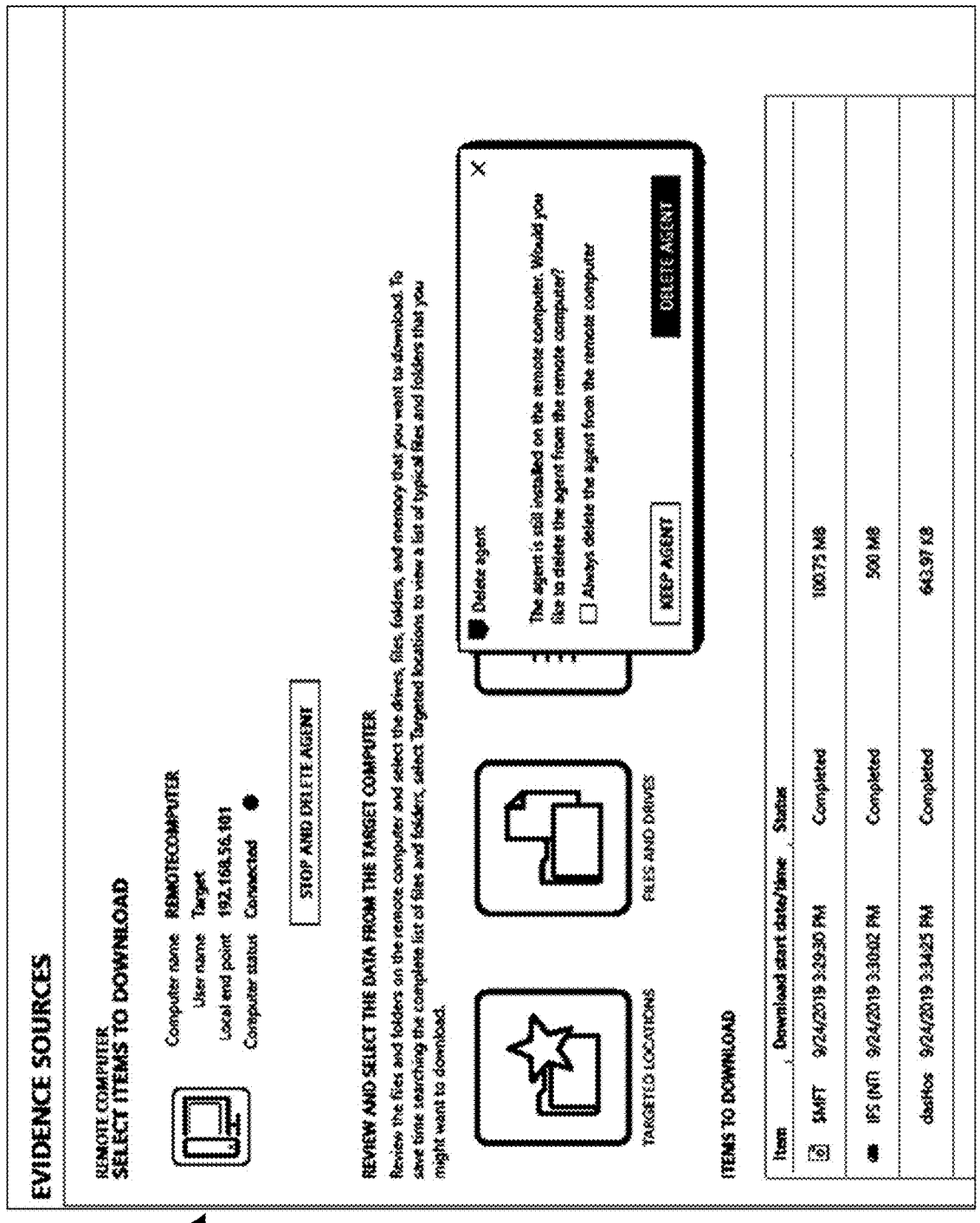
FIG. 5Q is an image of a screen from the process of targeted data acquisition, in accordance with the present systems, devices, and methods.
Figure 5R:
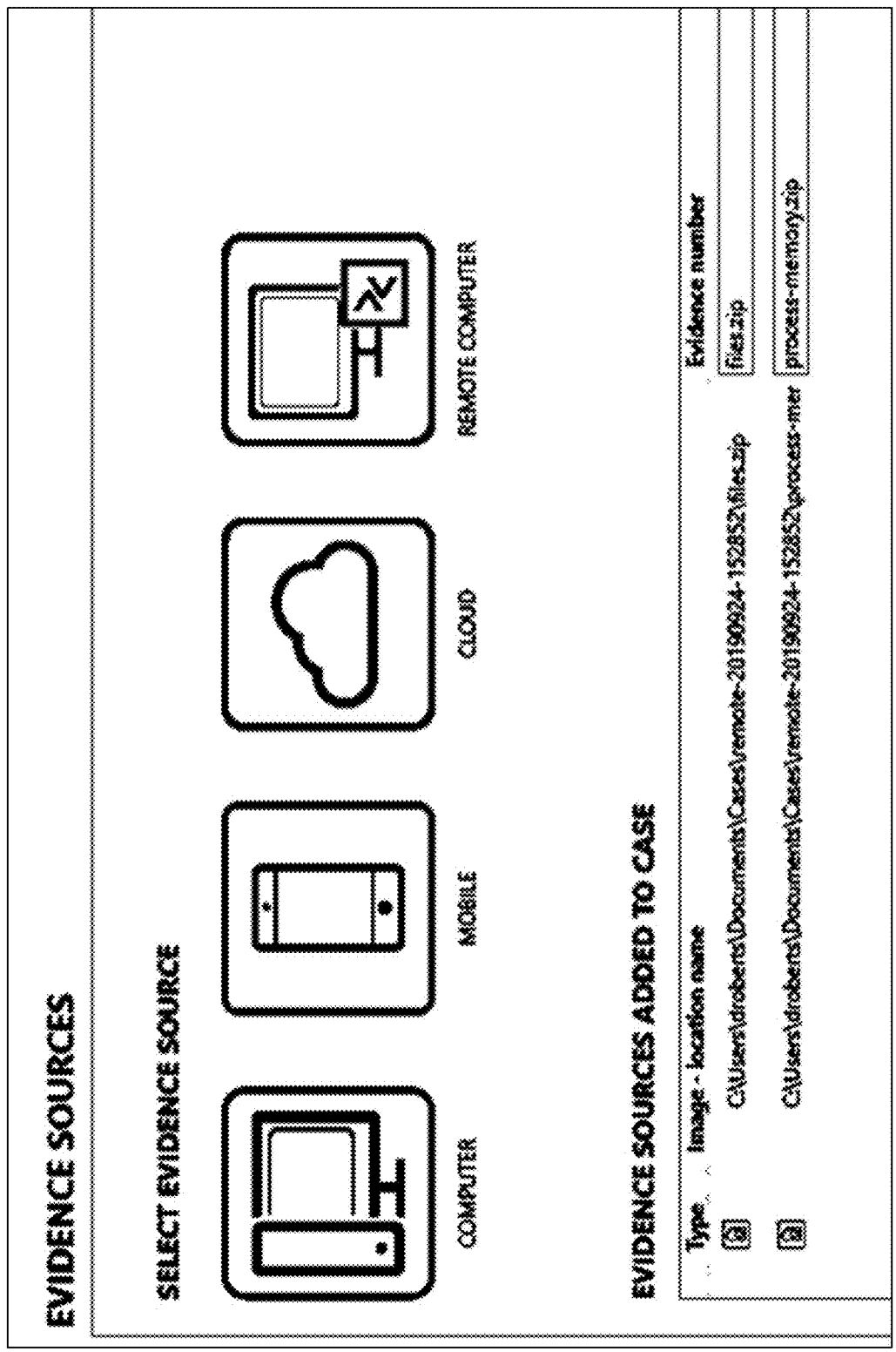
FIG. 5R is an image of a screen from the process of targeted data acquisition, in accordance with the present systems, devices, and methods.

FIGS. 5A-5R are images of a user interface of a software program which allows an examiner to perform a targeted data acquisition on a target endpoint system using an examiner device.

The targeted data acquisition system of FIGS. 5A-5R may be, for example, those shown and/or described in FIGS. 1-4. The targeted data acquisition system of FIGS. 5A-5R includes an examiner device, an agent, and a target endpoint system. The agent is an executable program configured to locate and send targeted data from a target endpoint system. The examiner device may be a computing device having at least one processor and a memory, wherein the memory includes data and/or instructions which can be executed by the at least one processor. The target endpoint system may be part of a device which is used by a target and stores data. The examiner device and the target endpoint device share a network but the target endpoint device does not need to be connected to the network for the target acquisition system to function.

FIGS. 5A-5R show user interfaces 500A-500R, respectively, which are representations of different stages of the targeted data acquisition process using the software program on the examiner device. The images are only exemplary and actual embodiments may differ.

Image 500A shows the home or front page user interface of the targeted data acquisition program which exists on the examiner device. The examiner chooses "Evidence Sources" to start an investigation. The present targeted data acquisition system described herein is used for remote investigations, therefore "Remote Computer" (in the dashed circle) is chosen by the examiner.

In image 500B, the examiner can choose to use an already created agent (an agent which was already configured with the details necessary to perform an investigation on the target endpoint system) by clicking on the correct file listed under agents (see Agent.exe under Name, Location, and Created Date/Time) or may choose to create a new agent by clicking on "Create New Agent". As discussed above for FIG. 2, in FIG. 5 an original agent exists on the examiner device and new agents are created by configuring the original agent to the specific needs of the current investigation. Image 500B may correspond at least in part to act 310 of FIG. 3.

In image 500C, the examiner has chosen to create a new agent. A screen for new agent configuration is generated which displays the types of details the examiner device needs to configure for the agent, including agent masking details, location details, and connectivity details. Image 500C may correspond at least in part to act 310 of FIG. 3, and acts 412, 414, and 416 of FIG. 4.

In image 500D, the examiner is configuring the agent details. The agent masking details may include any one or more of the agent name (what the file name of the agent will be on the target endpoint system), agent title (name of the agent), agent company (company using the agent), product information, agent description (any information which may assist in hiding the agent), copyright information, and agent trademark information. These details are configured so that the agent does not appear to be a remote targeted data acquisition agent if seen by the user of the target endpoint system and may not be easily discovered. Other embodiments may include other types of masking details. Image 500D may correspond at least in part to act 310 of FIG. 3, and acts 412, 414, and 416 of FIG. 4.

The agent location details include the folder name and file path where the agent will be stored on the examiner device.

The agent connectivity details include the examiner workstation hostname or IP address, the Port, the reconnect delay, and the disconnected keep alive. The examiner workstation hostname or IP address and Port allow the agent to connect to the examiner device when deployed and active on the target endpoint system. The reconnect delay is the interval of time at which the agent repeatedly attempts to connect to the examiner device once active, in this case 10 seconds. The disconnected keep alive is the amount of time the agent attempts to connect to the examiner device before stopping attempts, in this case 86, 400 seconds.

Once all details are configured the examiner device receives examiner input on the "Create Agent" selection.

In image 500E, the examiner can review agent details. The configuration details are shown and the examiner has the options to "Deploy Agent" or "Connect Agent". Deploy agent will deploy the agent to a target endpoint system and connect agent will connect to an agent that has already been deployed.

In Image 500F, the examiner device is instructed to deploy the agent. Deployment configuration details are received by the examiner device before the agent is deployed. The configuration details include any one or more of the IP address of the remote computer on which the target endpoint system exists, a domain name or address used by the target on the target endpoint system, the user name of the target endpoint system, the password of the target endpoint system, and the location on the target endpoint system where the agent will exist. Once these details are provided the examiner may click the "Deploy Agent" button. Image 500F may correspond at least in part to act 320 of FIG. 3, and acts 422 and 424 of FIG. 4.

Image 500G shows that the deployment of the agent is complete and that the launching of the agent (the agent becoming active on the target endpoint system) is in progress. Image 500G corresponds at least in part to act 320 of FIG. 3, and act 426 of FIG. 4.

Image 500H shows that the agent is launched and active on the target endpoint system. When the agent is active it may output a viability signal repeatedly at a defined interval of time (e.g. every 20 seconds) so that the examiner device knows that the agent remains active on the target endpoint system. The examiner can now click the "Connect to Agent" button to establish a connection to the agent. The agent will have been sending out connection attempts at the time interval defined in the agent connectivity details during agent creation since becoming active. Image 500H may correspond at least in part to act 330 of FIG. 3, and acts 432 and 434 of FIG. 4.

In image 500I, the examiner device may receive a selection of items to download from "Targeted Locations", "Files and Drives", or "Memory". Image 500I may correspond at least in part to act 340 of FIG. 3, and act 442 FIG. 4.

In image 500J, examiner input has caused the examiner device to display items from the pre-selected set of "Targeted Locations". The examiner has selected the $MFT (master file table) targeted location from the target endpoint system (checkmark shown beside $MFT). Image 500J may correspond at least in part to act 340 of FIG. 3, and acts 442 and 444 of FIG. 4.

In image 500K, the examiner device receives input of a request for the $MFT data of the target endpoint system from the agent and the examiner device is waiting to make a connection with the agent. Image 500K may correspond at least in part to act 340 of FIG. 3, and acts 442 and 444 of FIG. 4.

In image 500L, the examiner device downloads the $MFT from the target endpoint system. Image 500L may correspond at least in part to act 350 of FIG. 3, and acts 452 and 454 of FIG. 4.

In image 500M, the examiner device receives examiner selection of new items to download from the "Files and Drives" (see Image 500I). In this option, the examiner device may download "Files and Folders" which represent a logical image that contains all files and folders of the target endpoint system. The examiner device may download from "Drives" which represents a physical copy of the drives of the target endpoint system. Information from the $MFT file may have prompted the examiner device to download from "Drives". Image 500M may correspond at least in part to act 340 of FIG. 3, and acts 442 and 444 of FIG. 4.

In image 500N, the examiner device has requested and successfully downloaded the drive "IFS (NTFS or HPFS)" (title is cut off and only "IFS (NT" is shown) from the target endpoint system. Image 500N may correspond at least in part to acts 340 and 350 of FIG. 3, and acts 442, 444, 452, and 454 of FIG. 4.

In image 500O, the examiner device received input of a selection of new items to download from the "Memory" (see Image 500I). In this option, the examiner device may download data which includes information regarding memory processes on the target endpoint system. The examiner device requests "dasHost" from the agent. Image 500O may correspond at least in part to act 340 of FIG. 3, and acts 442 and 444 of FIG. 4.

In image 500P, the examiner device has successfully downloaded "dasHost" from the target endpoint system. Image 500P may correspond at least in part to acts 340 and 350 of FIG. 3, and acts 442, 444, 452, and 454 of FIG. 4.

In image 500Q, the examiner device has acquired all data selected and has gone back to the "Select Items in Download" page (see Image 500I). The examiner device may receive examiner input to "Stop and Delete Agent" button, and the examiner device stops the agent. The examiner device then either deletes the agent itself from the remote computer which contains the target endpoint system or keeps the agent on the target endpoint system. Image 500Q may correspond at least in part to acts 470a and 470b of FIG. 4.

Once the examiner device has acquired all the targeted data requested from the target endpoint system, the examiner device stores the evidence (targeted data) to the case at a location on the examiner device. In Image 500R, the examiner device displays where the evidence sources that are added to the case are now located.

In FIG. 5 and other embodiments herein, details for the configuration of the targeted data acquisition system may be suited to a specific operating system. It will be appreciated that other operating systems may require different configurations.

While the above description provides examples of one or more apparatus, methods, or systems, it will be appreciated that other apparatus, methods, or systems may be within the scope of the claims as interpreted by one of skill in the art.

The invention claimed is:

1. A system for targeted acquisition of data, the system comprising:
   an examiner device having a processor and a memory;
   an agent in the form of an executable program for finding and transferring targeted data; and
   a target endpoint system;
   wherein the examiner device is configured to deploy the agent to the target endpoint system;
   wherein the agent is configured to establish a connection with the examiner device after the agent is deployed to the target endpoint system;
   wherein the examiner device is further configured to pre-select a targeted location likely to contain the targeted data and send a request for the targeted data to the agent after the connection is established, wherein the request specifies the pre-selected targeted location likely to contain the targeted data;
   wherein the agent is further configured to locate the targeted data on the target endpoint system using the pre-selected targeted location specified in the request and transfer the targeted data to the examiner device; and
   wherein the examiner device is further configured to rebuild at least part of a file system of the target endpoint system from the targeted data.

2. The system of claim 1, wherein upon receipt of the targeted data from the agent the examiner device deletes the agent from the target endpoint system.

3. The system of claim 1, wherein upon receipt of the targeted data from the agent the agent remains on the target endpoint system.

4. The system of claim 1, wherein if the connection between the agent and the examiner device is lost the connection is re-established automatically.

5. The system of claim 1, wherein the examiner device creates the agent by configuring agent masking details, location details, and connectivity details of the agent.

6. The system of claim 1, wherein the agent is further configured to attempt to establish a connection with the examiner device at a first defined interval of time until such time as the connection is established.

7. The system of claim 1, wherein while the agent is deployed on the target endpoint system, the agent is further configured to send a viability signal at a second defined interval of time to the examiner device to confirm that the agent is still active.

8. The system of claim 1, wherein the targeted data includes any one or more of logical copies of files, binary data, memory, and live target endpoint system information.

9. A method of targeted acquisition of data from a target endpoint system, the method comprising:
   creating an agent by an examiner device, the agent comprising an executable program;
   deploying the agent to the target endpoint system by the examiner device;
   establishing a connection to the examiner device by the agent;
   pre-selecting a targeted location likely to contain the targeted data;
   requesting a first set of targeted data from the agent by the examiner device, wherein the request specifies the pre-selected targeted location likely to contain the first set of targeted data;
   locating the targeted data with the target endpoint system using the pre-selected targeted location specified in the request;
   sending the first set of targeted data from the target endpoint system to the examiner device by the agent; and
   rebuilding at least part of a file system of the target endpoint system from the targeted data by the examiner device.

10. The method of claim 9 further comprising:
    requesting, based on the first set of targeted data, a second set of targeted data from the agent by the examiner device.

11. The method of claim 9, wherein creating the agent by the examiner device includes:
    configuring masking details of the agent by the examiner device;
    configuring examiner device location details of the agent by the examiner device; and
    configuring connectivity details of the agent by the examiner device.

12. The method of claim 9, wherein deploying the agent to the target endpoint system by the examiner device includes configuring agent deployment details on the examiner device including target endpoint system information and a location at which to store the agent on the target endpoint device.

13. The method of claim 9, wherein connecting to the examiner device by the agent includes attempting to connect to the examiner device at a first defined interval of time by the agent.

14. The method of claim 9, wherein if the connection is lost the method further includes re-establishing the connection between the agent and the examiner device automatically.

15. The method of claim 9, wherein if the connection is lost when only a first part of the first set of targeted data has been sent by the agent, the method further comprises sending a second part of the first set of targeted data to the examiner device by the agent upon re-establishing the connection.

16. The method of claim 9 further comprising:
outputting a viability signal at a second defined interval of time by the agent while the agent is deployed on the target endpoint device, the viability signal demonstrating that the agent is active.

17. The method of claim 9, wherein requesting targeted data from the agent by the examiner device includes preselecting targeted data by the examiner device.

18. The method of claim 9 further comprising:
deleting the agent from the target endpoint system upon receipt of the first set of targeted data by the examiner device.

19. The method of claim 9, wherein the targeted data includes any one or more of logical copies of files, binary data, memory, and live target endpoint system information.

\* \* \* \* \*